(12) United States Patent
Nishima et al.

(10) Patent No.: US 7,170,678 B2
(45) Date of Patent: Jan. 30, 2007

(54) OPTICAL COLOR SEPARATION AND SYNTHESIS SYSTEM, AND METHOD OF CONSTRUCTING OPTICAL COLOR SEPARATION AND SYNTHESIS SYSTEM

(75) Inventors: Ryo Nishima, Yokohama (JP); Morihiko Ota, Moriya (JP)

(73) Assignee: Victor Company of Japan, Limited, Kanagawa-Ken (JP)

( * ) Notice: Subject to any disclaimer, the term of this patent is extended or adjusted under 35 U.S.C. 154(b) by 91 days.

(21) Appl. No.: 11/060,379

(22) Filed: Feb. 17, 2005

(65) Prior Publication Data
US 2005/0185305 A1    Aug. 25, 2005

(30) Foreign Application Priority Data
Feb. 20, 2004 (JP) ............................ P2004-044928
Nov. 26, 2004 (JP) ............................ P2004-342672

(51) Int. Cl.
*G02B 5/30* (2006.01)
*G02B 27/14* (2006.01)
*G02B 5/04* (2006.01)

(52) U.S. Cl. .................. 359/495; 359/831; 359/496; 359/500; 359/629

(58) Field of Classification Search ............... 359/253, 359/256, 495, 250, 247
See application file for complete search history.

(56) References Cited

U.S. PATENT DOCUMENTS

| | | | |
|---|---|---|---|
| 6,609,796 B2 * | 8/2003 | Maki et al. | 353/31 |
| 6,829,110 B2 * | 12/2004 | Watanabe | 359/822 |
| 6,984,041 B2 * | 1/2006 | Suzuki et al. | 353/33 |
| 2003/0151833 A1 * | 8/2003 | Berman et al. | 359/831 |

FOREIGN PATENT DOCUMENTS

| | | |
|---|---|---|
| JP | 2002-228809 | 8/2002 |
| JP | 2002-287094 | 10/2002 |

\* cited by examiner

*Primary Examiner*—Arnel Lavarias
*Assistant Examiner*—Aline D. McNaull
(74) *Attorney, Agent, or Firm*—Nath & Associates, PLLC; Gregory B. Kang; Matthew J. Moffa

(57) ABSTRACT

An optical color separation and synthesis system is constructed according to a method, in which four first to fourth polarization beam splitters are arranged in such a manner that polarization separating surfaces of the polarization beam splitters form an X-shape, a predetermined gap is formed between facing surfaces of the polarization beam splitters before bonding the polarization beam splitters onto a base platform, and thereafter a frame comprising an opening in a middle portion thereof and a stepped portion to be bonded to an optical function plate in a peripheral portion thereof is secured to any of the first to fourth polarization beam splitters.

4 Claims, 17 Drawing Sheets

ULTRAVIOLET IRRADIATION

PORTION IN WHICH ADHESIVE 16 STICKS OUT

FIG.6A
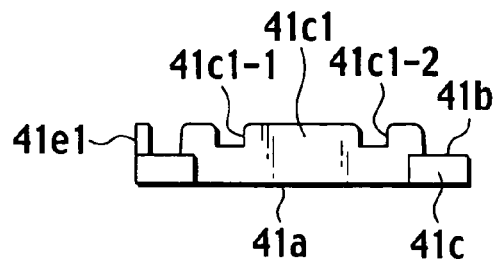
FIG.6D FIG.6C FIG.6B
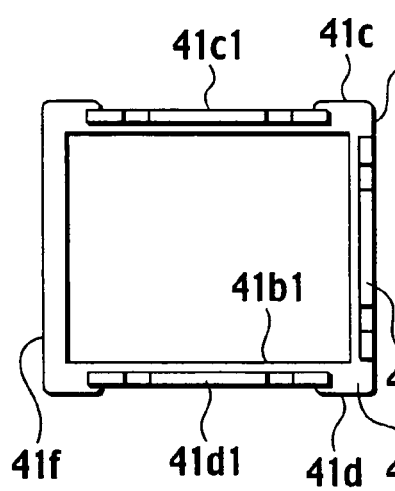 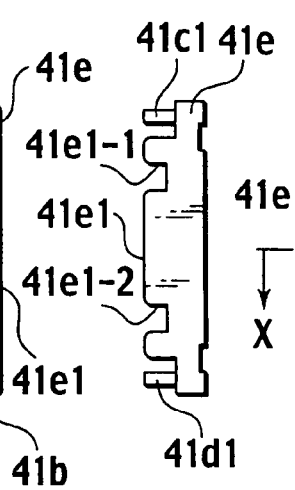 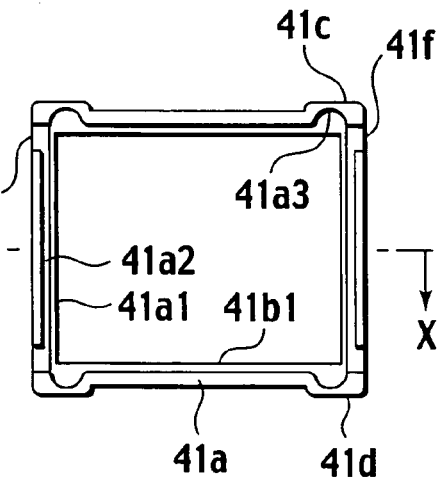
FIG.6E
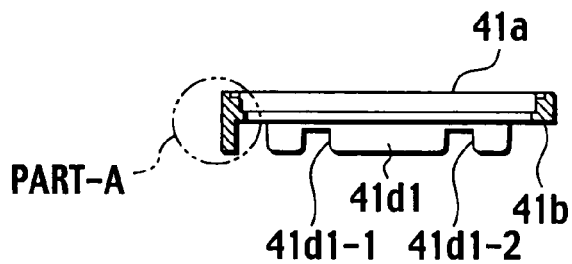
FIG.6F
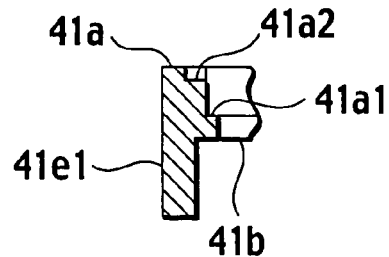

FIG.8A
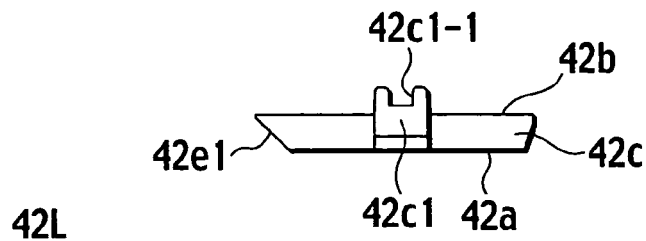
FIG.8D  FIG.8C  FIG.8B  FIG.8E
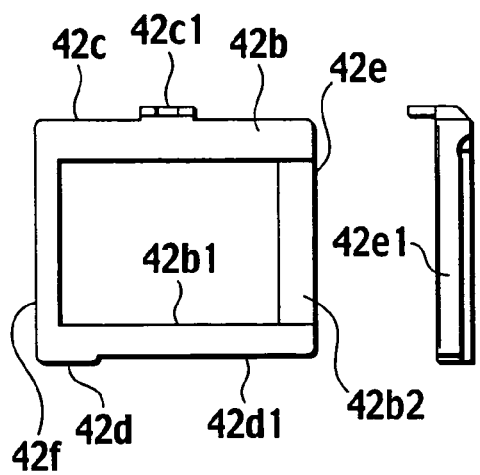 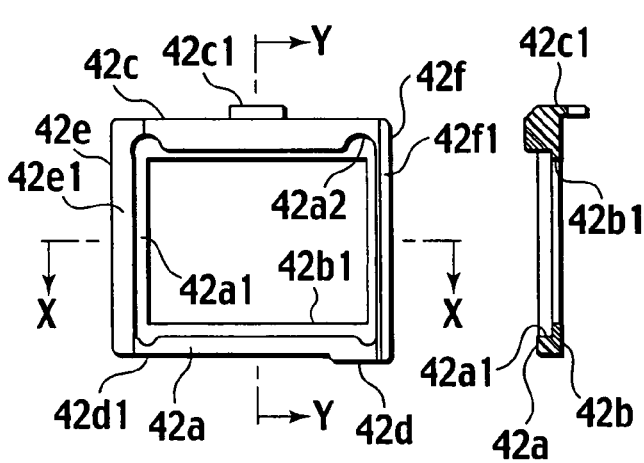 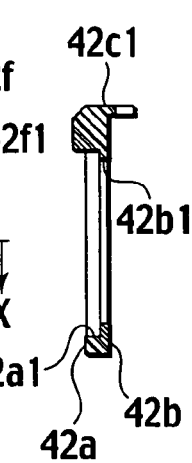
FIG.8G  FIG.8F
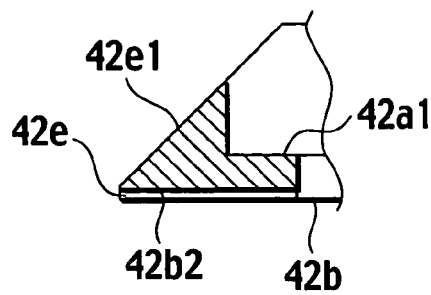 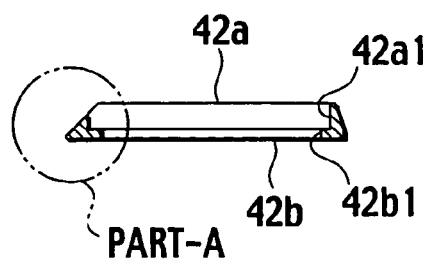
FIG.8H
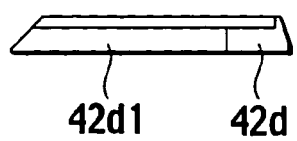

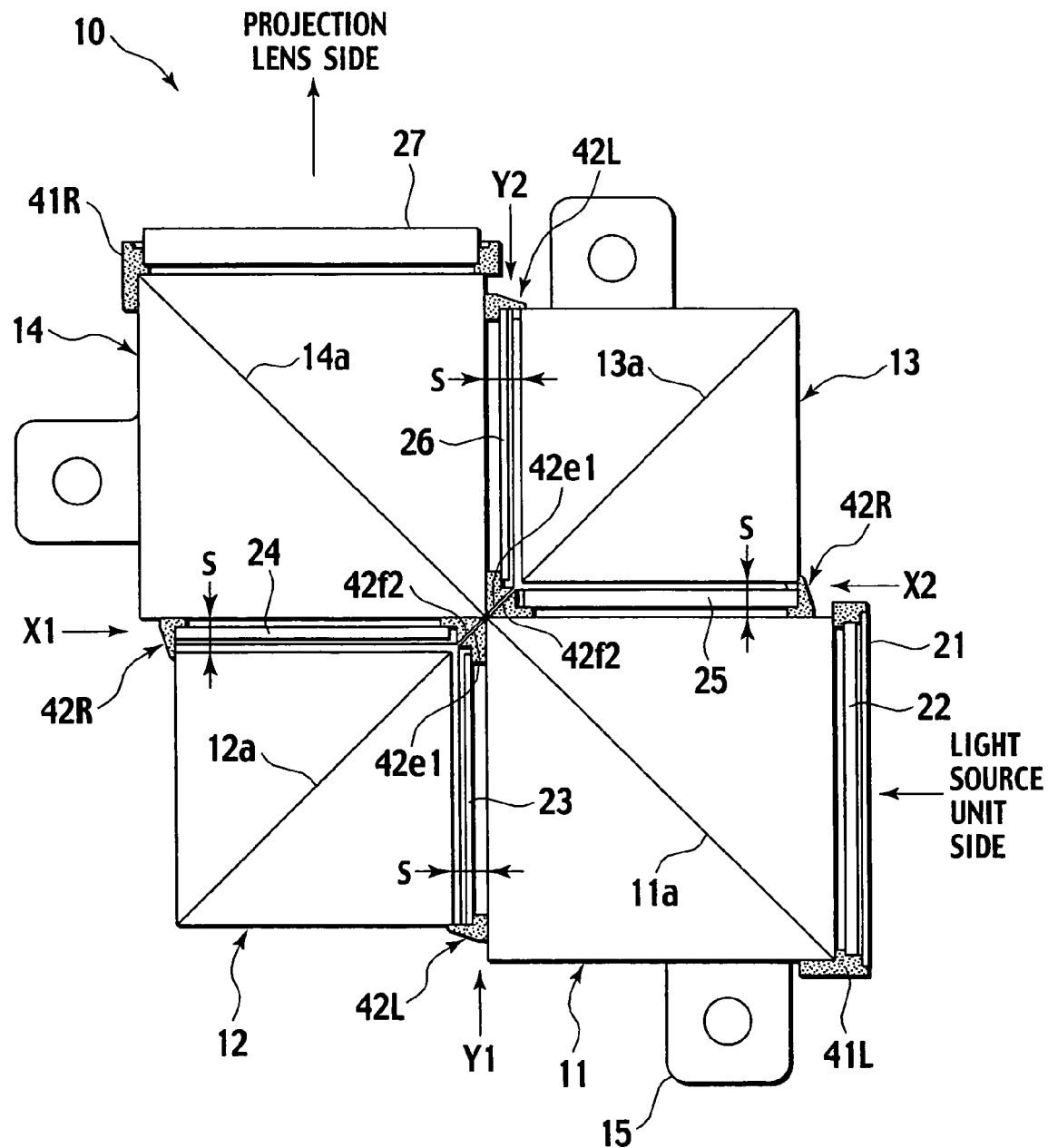

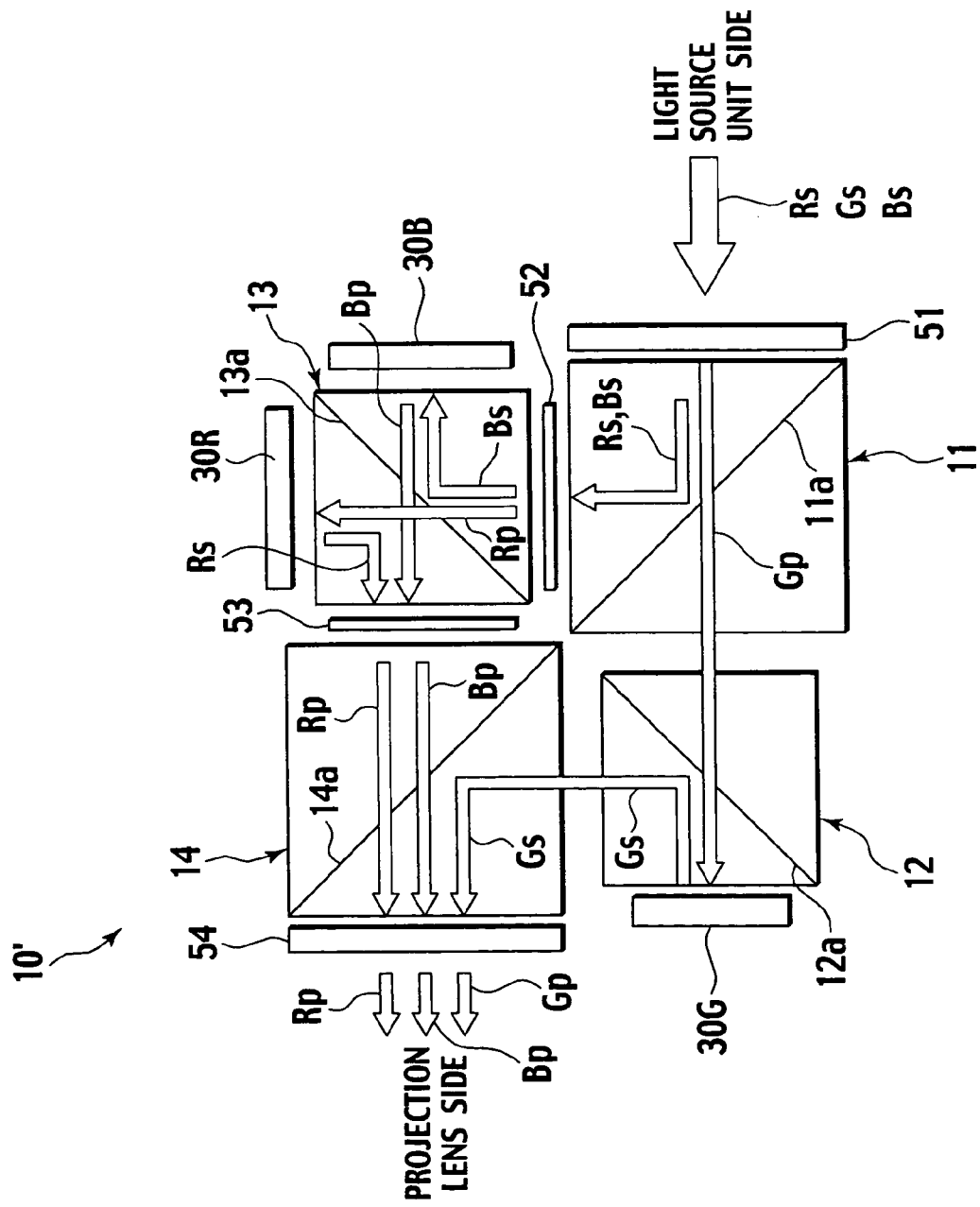

OPTICAL COLOR SEPARATION AND SYNTHESIS SYSTEM, AND METHOD OF CONSTRUCTING OPTICAL COLOR SEPARATION AND SYNTHESIS SYSTEM

BACKGROUND OF THE INVENTION

1. Technical Field of the Invention

The present invention relates to an optical color separation and synthesis system for use in a reflective type projection display apparatus, and a method of constructing an optical color separation and synthesis system.

2. Description of the Related Art

In an optical color separation and synthesis system for use in a projection display apparatus for projecting a color image, white light emitted from a light source unit is separated into light of three primary colors of red (R), green (G), and blue (B), and the three-primary-color light is guided to a corresponding spatial light modulation element of each color. Furthermore, color synthesized light obtained by synthesizing the color of each color light modulated by each color spatial light modulation element according to a video signal is emitted on the side of a projection lens.

As this type of optical color separation and synthesis system, the present applicants have previously proposed an example in which four first to fourth polarization beam splitters are arranged as a plurality of polarization beam splitters in such a manner that polarization separating surfaces of the respective polarization beam splitters form an X-shape as viewed from an upper-surface side. Moreover, if necessary, a wavelength selecting polarization transforming plate is disposed facing any of the first to fourth polarization beam splitters, the first polarization beam splitter is disposed on the side of the light source unit, and the fourth polarization beam splitter is disposed on the side of the projection lens. Then, the spatial light modulation elements of the respective colors corresponding to RGB are disposed facing any surface of the second, third polarization beam splitters (see, e.g., Japanese Patent Application Laid-Open Nos. 2002-228809 and 2002-287094).

In the Japanese Patent Application Laid-Open Nos. 2002-228809 and 2002-287094, although not shown, to construct the optical color separation and synthesis system, all of the four first to fourth polarization beam splitters are integrally bonded beforehand by a light transmitting bonding member (e.g., adhesive). Alternatively, two or three of the four first to fourth polarization beam splitters are integrally bonded beforehand by the light transmitting bonding member (e.g., adhesive). Thereafter, the four first to fourth polarization beam splitters are secured onto a base platform in such a manner that the polarization separating surfaces of the respective polarization beam splitters are arranged in an X-shape as viewed from the upper-surface side.

Additionally, in the Japanese Patent Application Laid-Open Nos. 2002-228809 and 2002-287094, an optical characteristic of the optical color separation and synthesis system is satisfactorily obtained. However, to integrally bond at least two or more polarization beam splitters to each other beforehand by the light transmitting bonding member (e.g., adhesive), the polarization beam splitters are mutually positioned. Moreover, if necessary, the wavelength selecting polarization transforming plate is inserted and integrally bonded between the facing surfaces of the polarization beam splitters. Therefore, much time is required in constructing the optical color separation and synthesis system, and problems occur in productivity.

SUMMARY OF THE INVENTION

There has been a demand for a optical color separation and synthesis system, and a method of constructing a optical color separation and synthesis system, by which various optical function plates such as a notch filter, wavelength selecting polarization transforming plate, half-wave plate, and ghost buster plate to be disposed facing any of first to fourth polarization beam splitters if necessary can be attached to the polarization beam splitters with good constructing properties, when a method is adopted. In the method, four first to fourth polarization beam splitters are secured to a base beforehand in such a manner that polarization separating surfaces of the respective polarization beam splitters form an X-shape as viewed from an upper-surface side, without integrally bonding the polarization beam splitters to one another beforehand by a light transmitting bonding member (e.g., adhesive). Additionally, optical characteristics of the optical color separation and synthesis system can be satisfactorily maintained, and further dust is also taken into consideration.

In order to achieve the above object, there is provided an optical color separation and synthesis system comprising at least first to fourth polarization beam splitters which chromatically separate white light into a plurality of color beams and which guide the plurality of color beams into a plurality of reflective type spatial light modulation elements corresponding to colors and which chromatically synthesize the respective color beams optically modulated by the respective color reflective type spatial light modulation elements according to a video signal to thereby emit color synthesized light; an optical function plate arranged facing any of the first to fourth polarization beam splitters; a base platform on which the first to fourth polarization beam splitters are arranged in such a manner that polarization separating surfaces of the polarization beam splitters form an X-shape and onto which the polarization beam splitters are bonded while a predetermined gap is formed between facing surfaces of the polarization beam splitters; and a plurality of frames each of which has an opening in a middle portion thereof and a stepped portion for bonding each optical function plate on a peripheral portion thereof and which are secured to any of the first to fourth polarization beam splitters.

According to the present invention, especially, the system comprises the base platform which arranges the first to fourth polarization beam splitters in such a manner that the polarization separating surfaces of the respective polarization beam splitters form the X-shape and which bonds the polarization beam splitters while forming the predetermined gap between the facing surfaces of the polarization beam splitters. The system also comprises a plurality of frames each comprising the opening in the middle portion thereof, and the stepped portion for bonding the optical function plate in the peripheral portion thereof, and each bonded to any of the first to fourth polarization beam splitters. Therefore, various optical function plates can be attached to the polarization beam splitters with good constructing properties, and further optical characteristics of the optical color separation and synthesis system can be satisfactorily maintained.

In a preferable embodiment of the present invention, the stepped portion of the frame inserted between the facing surfaces of the polarization beam splitters has a depth for allowing a part of the polarization beam splitter bonded to the stepped portion and facing the optical function plate to enter the stepped portion.

According to the mode, considerations can be taken in such a manner as to prevent the optical color separation and synthesis system from being invaded by dust.

In the preferable embodiment of the present invention, the frame inserted between the facing surfaces of the polarization beam splitters and having the stepped portion into which the optical function plate is bonded is appropriately combined with the frame having the stepped portion into which the optical function plate is not bonded, and the frames are arranged in such a manner as to cross each other at right angles.

In the preferable embodiment of the present invention, the frame disposed on an incidence side of white light has a bonding flange portion bonded to the first polarization beam splitter and formed in such a manner as to protrude behind a rear surface on an opposite side of a front surface along any side surface of the frame. On the other hand, the frame disposed on an emission side of color synthesized light has a bonding flange portion bonded to the fourth polarization beam splitter and formed in such a manner as to protrude behind the rear surface on the opposite side of the front surface along any side surface of the frame.

According to the mode, the frames can be securely bonded to the first and fourth polarization beam splitters by the adhesive.

In the preferable embodiment of the present invention, in each of the frames disposed on the incidence side of the white light and on the emission side of the color synthesized light, a concave groove for charging the adhesive in the protruded bonding flange portion is formed in an opened state on a rear end, or a through hole for charging the adhesive in the bonding flange portion is formed.

Furthermore, in order to achieve the above object, there is provided a method of constructing an optical color separation and synthesis system comprising at least first to fourth polarization beam splitters which chromatically separate white light into a plurality of color beams and which guide the plurality of color beams into a plurality of reflective type spatial light modulation elements corresponding to colors and which chromatically synthesize the respective color beams optically modulated by the respective color reflective type spatial light modulation elements according to a video signal to thereby emit color synthesized light; and an optical function plate arranged facing any of the first to fourth polarization beam splitters, the method comprising: arranging the first to fourth polarization beam splitters in such a manner that polarization separating surfaces of the polarization beam splitters form an X-shape; forming a predetermined gap between facing surfaces of the polarization beam splitters to bond the polarization beam splitters onto a base platform; and thereafter securing a frame comprising an opening in a middle portion thereof and a stepped portion for bonding the optical function plate on a peripheral portion thereof to any of the first to fourth polarization beam splitters.

According to the present invention, especially, the first to fourth polarization beam splitters are arranged in such a manner that the polarization separating surfaces of the respective polarization beam splitters form the X-shape, and bonded to the base platform while forming the predetermined gap between the facing surfaces of the polarization beam splitters. Thereafter, the frame having the opening in the middle portion, and the stepped portion to be bonded to the optical function plate in the peripheral portion is secured to any of the first to fourth polarization beam splitters. Therefore, various optical function plates can be attached to the polarization beam splitter with good constructing properties, and further optical characteristics of the optical color separation and synthesis system can be satisfactorily maintained.

The nature, principle and utility of the invention will become more apparent from the following detailed description when read in conjunction with the accompanying drawings.

BRIEF DESCRIPTION OF THE DRAWINGS

In the accompanying drawings:

FIGS. 6A to 6F are top plan view, front view, left-side view, rear view, X—X sectional view, and part-A enlarged view showing the first frame 41L;

FIGS. 8A to 8H are top plan view, front view, left-side view, rear view, Y—Y sectional view, X—X sectional view, part-A enlarged view, and bottom plan view showing the second frame 42L;

FIG. 9 is a partially sectional plan view showing that the optical color separation and synthesis system of Embodiment 1 according to the present invention is constructed;

FIG. 14A is a perspective view, FIG. 14B is an X—X arrow sectional view, and FIG. 14C is a Y—Y arrow sectional view;

FIG. 15A is a perspective view, FIG. 15B is an X—X arrow sectional view, and FIG. 15C is a Y—Y arrow sectional view;

FIG. 16A is a perspective view, FIG. 16B is an X—X arrow sectional view, and FIG. 16C is a Y—Y arrow sectional view;

FIG. 17 is a principle diagram of the optical color separation and synthesis system of Embodiment 2 according to the present invention.

DESCRIPTION OF THE PREFERRED EMBODIMENTS

Embodiments of an optical color separation and synthesis system, and a method of constructing the optical color separation and synthesis system according to the present invention will be described hereinafter in detail in order of Embodiments 1, 2 with reference to FIGS. 1 to 18.

<Embodiment 1>

Figure 1:
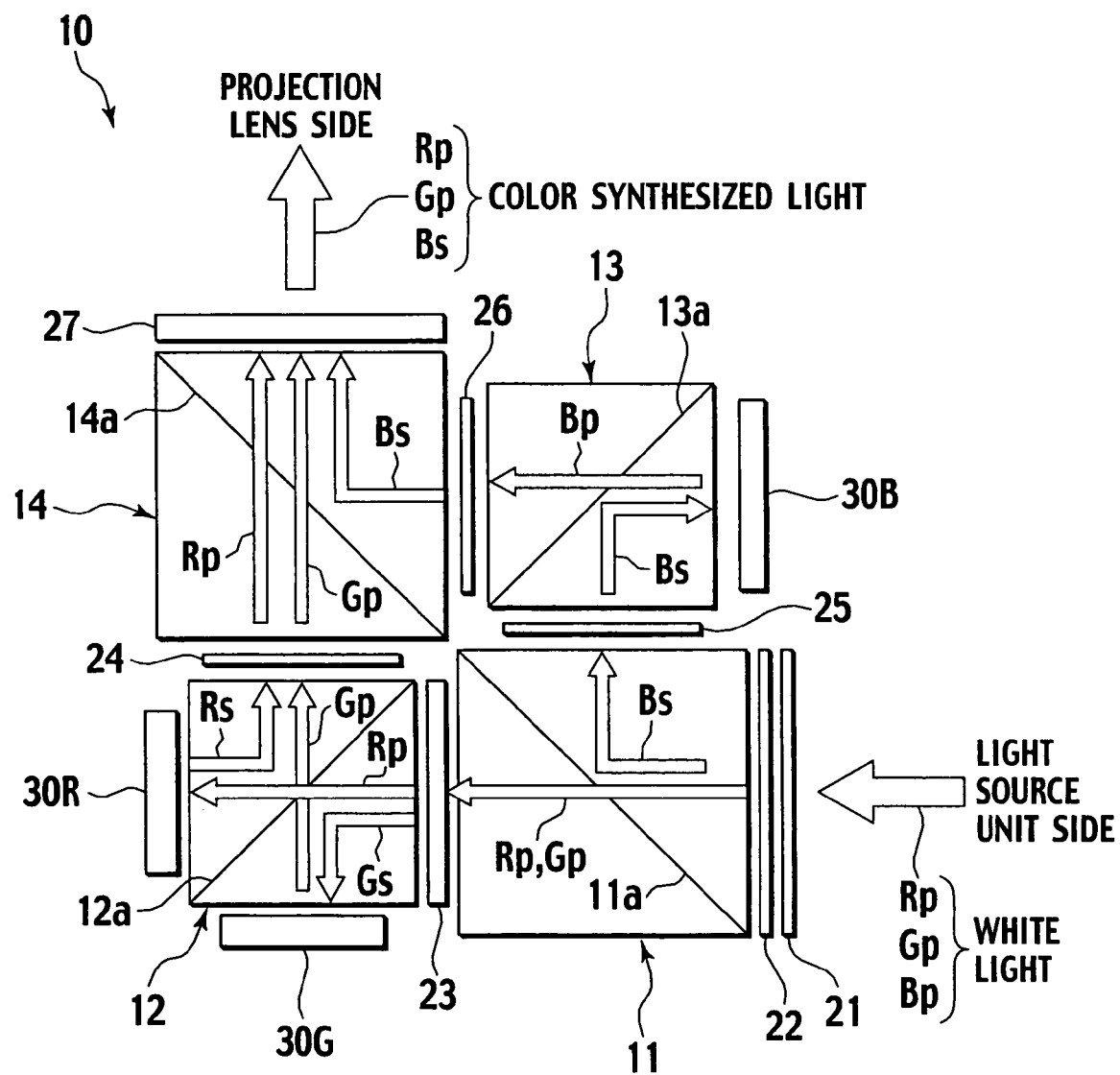
FIG. 1 is a principle diagram of an optical color separation and synthesis system of Embodiment 1 according to the present invention.
Figure 2:
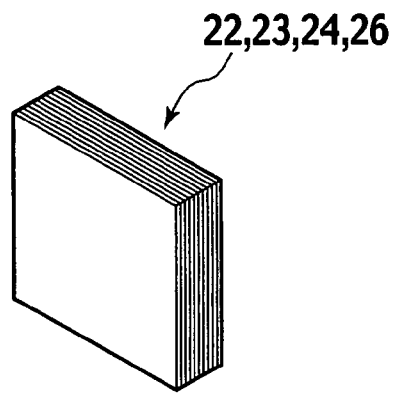
FIG. 2 is an enlarged perspective view showing wavelength selecting polarization transforming plates (polarization transforming plates for R, G, B) shown in FIG. 1.

FIG. 1 is a principle diagram of an optical color separation and synthesis system of Embodiment 1 according to the present invention. FIG. 2 is an enlarged perspective view showing wavelength selecting polarization transforming plates (polarization transforming plates for R, G, B) shown in FIG. 1.

An optical color separation and synthesis system 10 of Embodiment 1 according to the present invention shown in FIG. 1 is disposed between a light source unit and a projection lens in a reflective type projection display apparatus.

The optical color separation and synthesis system 10 has a function of separating a white beam emitted from the light source unit into three primary color beams of red (R), green (G), and blue (B), and guiding the three primary color beams to three reflective type spatial light modulation elements 30R, 30G, 30B corresponding to R, G, B, respectively. Furthermore, the system has a function of emitting color synthesized light, to a projection lens side, obtained by chromatically synthesizing the respective color beams optically modulated by the reflective type spatial light modulation elements 30R, 30G, 30B of the respective colors according to a video signal.

In this case, for example, reflective type liquid crystal panels are used in the reflective type spatial light modulation elements 30R, 30G, 30B corresponding to the three primary color beams of R, G, B, and the reflective type spatial light modulation elements 30R, 30G, 30B will be hereinafter referred to as the reflective type liquid crystal panels 30R, 30G, 30B.

More concretely, in the optical color separation and synthesis system 10 of Embodiment 1 according to the present invention, four first to fourth polarization beam splitters 11 to 14 formed into rectangular parallelepiped shapes (also including cubic shapes) using optical glass are arranged in such a manner that polarization separating surfaces 11a to 14a of the respective polarization beam splitters form an X-shape as viewed from an upper-surface side.

In this case, in the plan view of FIG. 1, the second polarization beam splitter 12 is disposed on the left side of the first polarization beam splitter 11. Moreover, the third polarization beam splitter 13 is disposed above the first polarization beam splitter 11, and the fourth polarization beam splitter 14 is disposed above the second polarization beam splitter 12 and on the left side of the third polarization beam splitter 13. Furthermore, a light incidence surface of the first polarization beam splitter 11 crosses a light emission surface of the fourth polarization beam splitter 14 at right angles by arrangement relations of various optical function plates 21 to 27 and reflective type liquid crystal panels 30R, 30G, 30B described later.

Moreover, the first polarization beam splitter 11 which white light enters on the light source unit side, and the fourth polarization beam splitter 14 which emits the color synthesized light on the projection lens side are formed into large sizes. Moreover, the respective polarization separating surfaces 11a, 14a of the first and fourth polarization beam splitters 11, 14 are diagonally arranged.

Moreover, the second and third polarization beam splitters 12, 13 are formed to be one size smaller than the first and fourth polarization beam splitters 11, 14. Moreover, the respective polarization separating surfaces 12a, 13a of the second and third polarization beam splitters 12, 13 are diagonally arranged in such a manner as to cross the polarization separating surfaces 11a, 14a of the first and fourth polarization beam splitters 11, 14 at right angles.

Furthermore, on the respective polarization separating surfaces 11a to 14a of the first to fourth polarization beam splitters 11 to 14, a translucent/reflective polarization film which transmits p-polarized light and reflects s-polarized light is formed along a diagonal line of the rectangular parallelepiped shape.

It is to be noted that in the following description, an Rp beam, Gp beam, and Bp beam of three colors indicate the p-polarized light corresponding to R, G, B, respectively, as described later. On the other hand, an Rs beam, Gs beam, and Bs beam of three colors indicate the s-polarized light corresponding to R, G, B, respectively.

Additionally, the reflective type liquid crystal panel 30R for R, and the reflective type liquid crystal panel 30G for G are disposed facing the left-side surface and the lower surface of the small-sized second polarization beam splitter 12 in such a manner as to cross each other at right angles. Moreover, the reflective type liquid crystal panel 30B is disposed facing the right-side surface of the small-sized third polarization beam splitter 13. Accordingly, the reflective type liquid crystal panels 30R, 30G, 30B can be arranged substantially on extension lines of outer frames of the first and fourth polarization beam splitters 11, 14. Therefore, the optical color separation and synthesis system 10 can be miniaturized.

It is to be noted that all the first to fourth polarization beam splitters 11 to 14 may be formed into equal sizes. In this case, the reflective type liquid crystal panels 30R, 30G, 30B are arranged outside the extension lines of the respective outer frames of the first and fourth polarization beam splitters 11, 14. Therefore, the optical color separation and synthesis system 10 is larger than that of Embodiment 1.

Moreover, a notch filter plate 21 which cuts light having a wavelength in the vicinity of 580 nm, and a wavelength selecting polarization transforming plate (hereinafter referred to as the polarization transforming plate for B) 22 having a function of rotating the polarization surface of B light by 90° are disposed beside the light incidence surface of the first polarization beam splitter 11 on the light source unit side. A wavelength selecting polarization transforming plate (hereinafter referred to as the polarization transforming plate for G) 23 having a function of rotating the polarization surface of G light by 90° is disposed between the first polarization beam splitter 11 and the second polarization beam splitter 12. A wavelength selecting polarization transforming plate (hereinafter referred to as the polarization transforming plate for R) 24 having a function of rotating the polarization surface of R light by 90° is disposed between the second polarization beam splitter 12 and the fourth polarization beam splitter 14. A half-wave plate 25 for adjusting the polarization is disposed between the first polarization beam splitter 11 and the third polarization beam splitter 13. A wavelength selecting polarization transforming plate (hereinafter referred to as the polarization transforming plate for B) 26 having a function of rotating the polarization surface of B light by 90° is disposed between the third polarization beam splitter 13 and the fourth polarization beam splitter 14. A ghost buster plate 27 for turning the light emitted from the emission surface by $\lambda/4$ with respect to a wavelength $\lambda$ of the light to prevent the light from being returned into the optical color separation and synthesis system 10 is disposed beside the light emission surface of the fourth polarization beam splitter 14 on the projection lens side.

In this case, as each of the wavelength selecting polarization transforming plates for the respective colors, including the polarization transforming plate 22 for B, the polarization transforming plate 23 for G, the polarization transforming plate 24 for R, and the polarization transforming plate 26 for B, as enlarged and shown in FIG. 2, organic films of transparent polycarbonate are laminated (stacked) in about ten layers having different phases. This polycarbonate laminate member having a thickness of about 0.6 to 0.9 mm is formed into a plate shape in accordance with an outer shape of each of the polarization beam splitters 11 to 14.

Among the above-described constituting members, the notch filter plate 21, polarization transforming plate 22 for B, polarization transforming plate 23 for G, polarization transforming plate 24 for R, half-wavelength plate 25, polarization transforming plate 26 for B, and ghost buster plate 27 have inherent optical functions, when transmitting the light. Therefore, these members will be sometimes generically referred to as the optical function plates formed into light transmitting types.

Next, an operation of the optical color separation and synthesis system 10 constituted as described above will be described with reference to FIG. 1. The white light comprising the p-polarized light including the Rp, Gp, and Bp beams obtained from the light source unit is first applied into the notch filter plate 21. After light having a wavelength of around 580 nm is cut by the notch filter plate 21, the light enters the polarization transforming plate 22 for B. Then, the Bp beam of the p-polarized light is polarized/transformed into the Bs beam of the s-polarized light by the polarization transforming plate 22 for B, and enters the first polarization beam splitter 11. Moreover, since the polarization transforming plate 22 for B does not act on the Rp and Gp beams of the p-polarized light, the Rp and Gp beams passes through the polarization transforming plate 22 for B, and enters the first polarization beam splitter 11.

Moreover, the Rp and Gp beams of the p-polarized light, which have entered the first polarization beam splitter 11, pass through the polarization separating surface 11a, travel straight as such, and enter the polarization transforming plate 23 for G. Then, since the polarization transforming plate 23 for G does not act on the Rp beam of the p-polarized light, the Rp beam passes through the polarization transforming plate 23 for G, and enters the second polarization beam splitter 12. Moreover, the Gp beam of the p-polarized light is polarized/transformed into the Gs beam of the s-polarized light by the polarization transforming plate 23 for G, and enters the second polarization beam splitter 12.

Thereafter, the Rp beam of the p-polarized light which entered the second polarization beam splitter 12 passes through the polarization separating surface 12a, and enters the reflective type liquid crystal panel 30R for R. The beam is optically modulated by the reflective type liquid crystal panel 30R for R according to the video signal corresponding to R, and the optically modulated and produced Rs beam which is an s-polarized light component is emitted from the reflective type liquid crystal panel 30R. The beam is reflected by the polarization separating surface 12a, thereafter turns its direction by 90°, and enters the polarization transforming plate 24 for R. On the other hand, the Gs beam of the s-polarized light which has entered the second polarization beam splitter 12 is reflected by the polarization separating surface 12a, thereafter turns its direction by 90°, and enters the reflective type liquid crystal panel 30G for G. The beam is optically modulated by the reflective type liquid crystal panel 30G for G according to the video signal corresponding to G, and the optically modulated and produced Gp beam which is a p-polarized light component is emitted from the reflective type liquid crystal panel 30G, passes through the polarization separating surface 12a, and enters the polarization transforming plate 24 for R.

Moreover, the Rs beam of the s-polarized light which has entered the polarization transforming plate 24 for R is polarized/transformed into the Rp beam of the p-polarized light, and enters the fourth polarization beam splitter 14. On the other hand, the Gp beam of the p-polarized light which has entered the polarization transforming plate 24 for R does not act. Therefore, the Gp beam passes through the polarization transforming plate 24 for R, and enters the fourth polarization beam splitter 14.

Thereafter, the Rp and Gp beams of the p-polarized light, which have entered the fourth polarization beam splitter 14, pass through the polarization separating surface 14a, travel straight as such, and are emitted on a projection lens side via the ghost buster plate 27. In this case, as described above, the ghost buster plate 27 turns the light emitted from the fourth polarization beam splitter 14 by $\lambda/4$ with respect to the wavelength $\lambda$ of the light, and prevents the light from being returned into the optical color separation and synthesis system 10.

Moreover, the Bs beam of the s-polarized light which has entered the first polarization beam splitter 11 is reflected by the polarization separating surface 11a, thereafter turns its direction by 90°, and enters the half-wave plate 25. After the half-wave plate 25 adjusts the polarization, the beam enters the third polarization beam splitter 13. Thereafter, the Bs beam of the s-polarized light which has entered the third polarization beam splitter 13 is reflected by the polarization separating surface 13a, thereafter turns its direction by 90°, and enters the reflective type liquid crystal panel 30B for B. The beam is optically modulated by the reflective type liquid crystal panel 30B for B according to the video signal corresponding to B, and the optically modulated and produced Bp beam which is a p-polarized light component is emitted from the reflective type liquid crystal panel 30B. The beam passes through the polarization separating surface 13a, travels straight as such, and enters the polarization transforming plate 26 for B. Moreover, the Bp beam which has entered the polarization transforming plate 26 for B and which is the p-polarized light component is polarized/transformed into the Bs beam of the s-polarized light, and the beam enters the fourth polarization beam splitter 14. Furthermore, the Bs beam of the s-polarized light which has entered the fourth polarization beam splitter 14 is reflected by the polarization separating surface 14a, turns its direction by 90°, and is emitted on the projection lens side via the ghost buster plate 27. Thereafter, the color synthesized light obtained by synthesizing the Rp and Gp beams of the p-polarized light from the light emission surface of the fourth polarization beam splitter 14 and the Bs beam of the s-polarized light is emitted on the projection lens side via the ghost buster plate 27.

Next, a technical idea in the optical color separation and synthesis system 10 constituted as described above will be described. In the system, the first to fourth polarization beam splitters 11 to 14 are bonded onto a base platform 15, and various optical function plates, including the notch filter plate 21, polarization transforming plate 22 for B, polarization transforming plate 23 for G, polarization transforming plate 24 for R, half-wavelength plate 25, polarization transforming plate 26 for B, ghost buster plate 27 and the like, are attached to the first to fourth polarization beam splitters 11 to 14 in predetermined positions. It is to be noted that the drawing is complicated and therefore omitted in hereinafter describing the reflective type liquid crystal panels 30R, 30G, 30B constituting the optical color separation and synthesis system 10.

Figure 3:
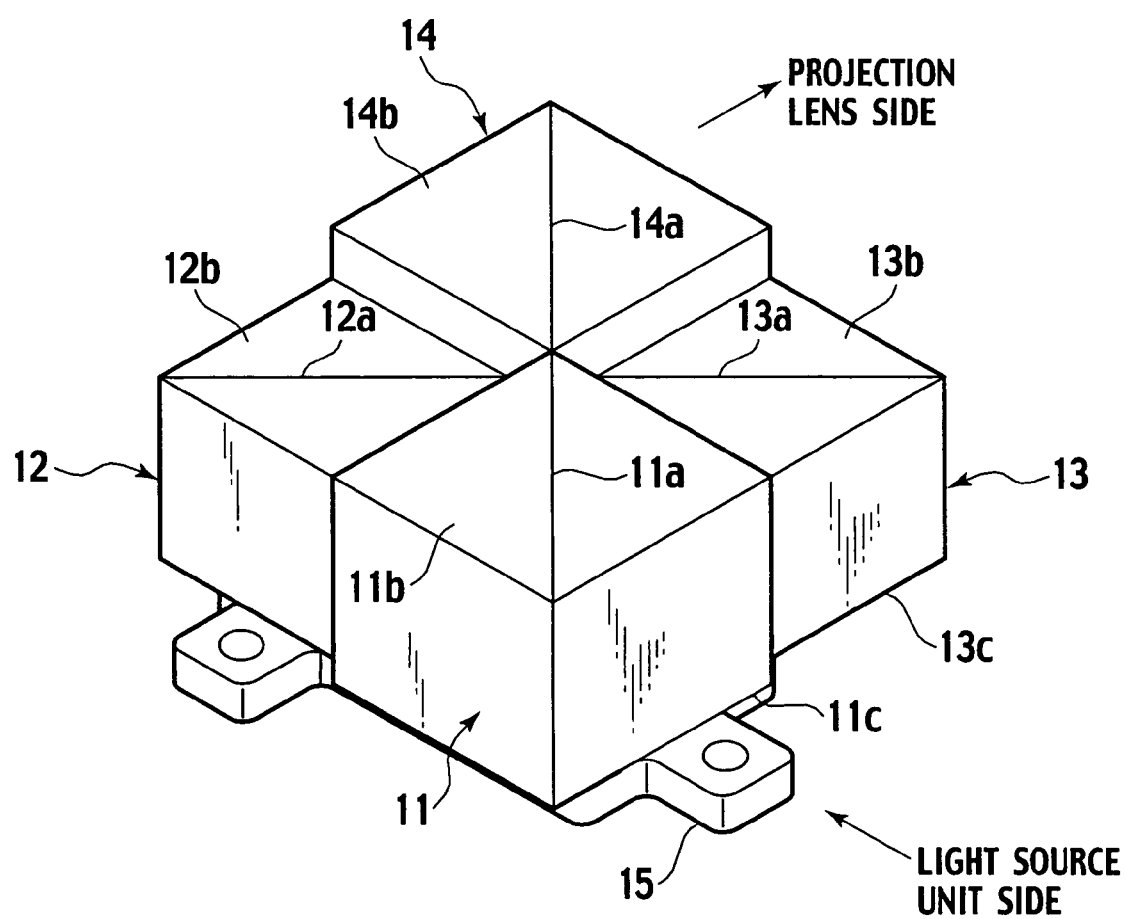
FIG. 3 is a perspective view showing a state in which four first to fourth polarization beam splitters are bonded onto a base platform beforehand.
Figure 4A:
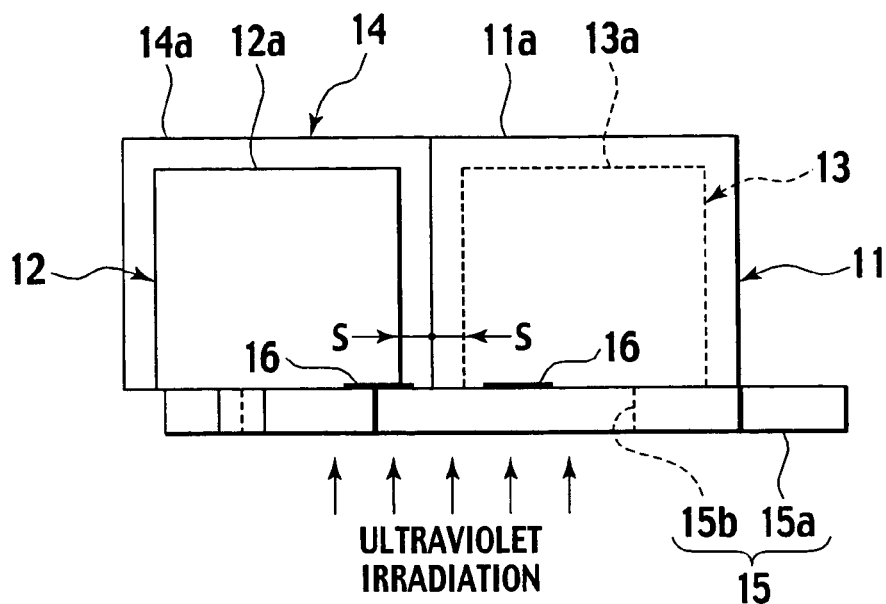
FIGS. 4A and 4B are side view and bottom plan view showing an operation of bonding the four first to fourth polarization beam splitters onto the base platform.
Figure 4B:
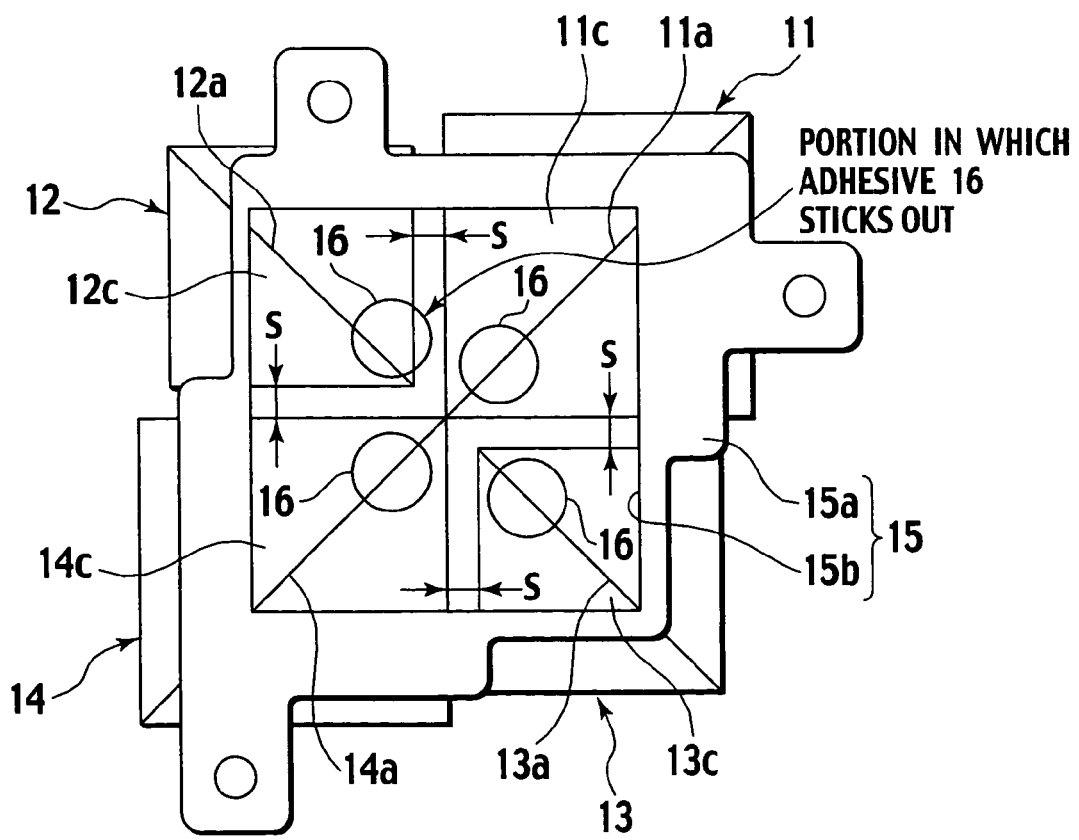

FIG. 3 is a perspective view showing a state in which four first to fourth polarization beam splitters are bonded onto the base platform beforehand. FIGS. 4A and 4B are side view and bottom plan view showing an operation of bonding the four first to fourth polarization beam splitters onto the base platform.

As shown in FIGS. 3, 4A and 4B, when the optical color separation and synthesis system 10 of Embodiment 1 according to the present invention is constructed, four first to fourth polarization beam splitters 11 to 14 are bonded onto the base platform 15 beforehand.

That is, four first to fourth polarization beam splitters 11 to 14 are grasped by a known robot, and mounted onto the base platform 15 in such a manner that the polarization separating surfaces 11a to 14a of the respective polarization beam splitters (11 to 14) form an X-shape when viewed from upper surfaces 11b to 14b. Moreover, a predetermined gap S (FIGS. 4A and 4B) is formed between facing surfaces of the polarization beam splitters (11 to 14). Additionally, after positioning the first to fourth polarization beam splitters 11 to 14 using an optical measurement unit, lower surfaces 11c to 14c of the splitters are bonded using an ultraviolet setting resin adhesive 16.

Concretely, as shown in FIGS. 4A and 4B, as to the base platform 15, square transparent glass 15b is fitted inside an outer frame 15a formed using a black resin material, and integrally secured/bonded. Moreover, the ultraviolet setting resin adhesives 16 are applied to the vicinities of corner portions in which the polarization separating surfaces 11a to 14a cross one another in the X-shape in the respective lower surfaces 11c to 14c of the four first to fourth polarization beam splitters 11 to 14. Then, the first to fourth polarization beam splitters 11 to 14 are positioned in predetermined positions on the base platform 15, and thereafter ultraviolet rays are applied from below the transparent glass 15b to thereby bond the lower surfaces.

In this case, the predetermined gaps S are formed to be substantially equal between the first and second polarization beam splitters 11, 12, between the second and fourth polarization beam splitters 12, 14, between the fourth and third polarization beam splitters 14, 13, and between the third and first polarization beam splitters 13, 11 on the base platform 15. As described later, the second frames 42L, 42R (FIG. 7) to which the optical function plates are bonded can be inserted in each predetermined gap S from the facing side surfaces of the polarization beam splitters (11 to 14). Additionally, countermeasures are applied to the respective lower surfaces of the second frames 42L, 42R in a case where the ultraviolet setting resin adhesive 16 sticks out in the predetermined gap S on the base platform 15. The countermeasures will be described later.

Here, the first frames 41L, 41R for use in attaching various optical function plates to the light incidence surface of the first polarization beam splitter 11 and the light emission surface of the fourth polarization beam splitter 14 will be described with reference to FIGS. 5A and 5B, 6A to 6F.

Figure 5A:
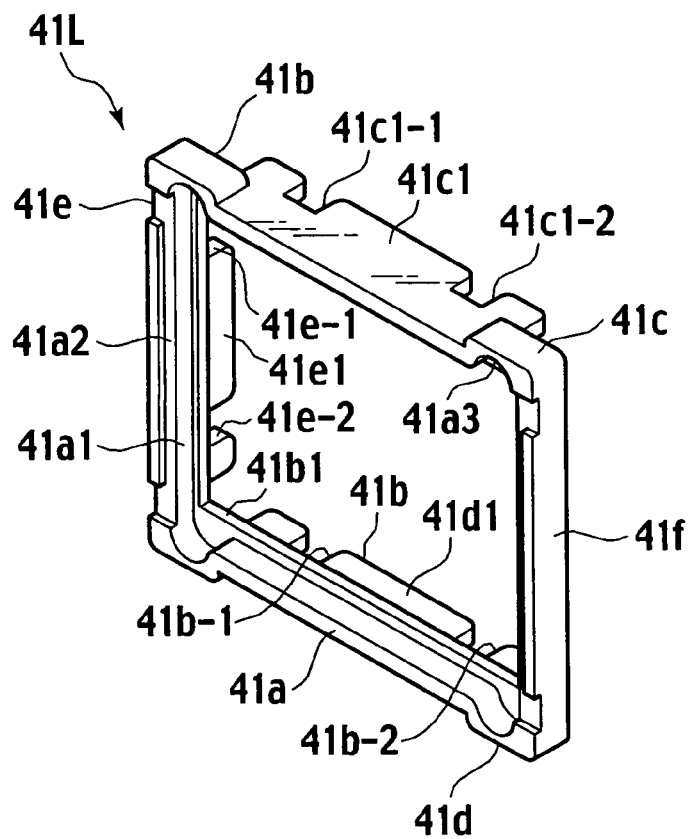
FIGS. 5A and 5B are enlarged perspective views showing first frames 41L, 41R.
Figure 5B:
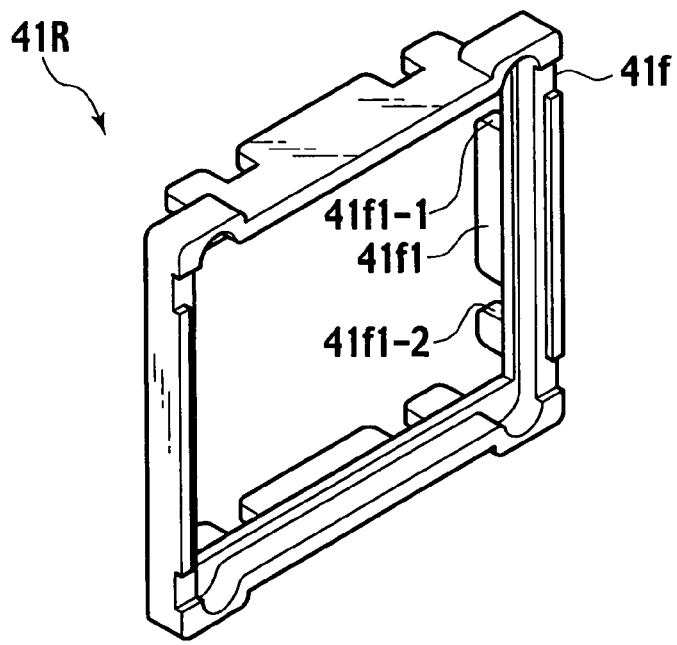

FIGS. 5A and 5B are enlarged perspective views showing the first frames 41L, 41R. FIGS. 6A to 6F are top plan view, front view, left-side view, rear view, X—X sectional view, and part-A enlarged view showing the first frame 41L.

As shown in FIGS. 5A and 5B, the first frames 41L, 41R are formed into substantially rectangular frame shapes using a black resin material having a thermal expansion coefficient substantially equal to that of the optical function plate, and are formed into one size larger vertical/horizontal dimensions as compared with those of the large-sized first and fourth polarization beam splitters 11, 14. The first frames 41L, 41R are different from each other only in that the bonding flange portions formed on the right/left side surfaces are symmetrically formed, and other portions are formed into the same shapes.

That is, as shown in FIGS. 5A, 6A to 6F, in the first frame 41L attached to the light incidence surface of the first polarization beam splitter 11, a first stepped portion 41a1 is opened into a rectangular frame shape in accordance with an optical function plate having a predetermined outer dimension in an inner peripheral portion on the side of a front surface 41a. Moreover, a second stepped portion 41a2 having one size larger outer dimension is opened into a rectangular frame shape in accordance with one size larger optical function plate as compared with the predetermined outer dimension in a front peripheral portion of the first stepped portion 41a1. Furthermore, four paste margin portions 41a3 for the adhesives are formed in upper/lower/right/left corner portions of the first stepped portion 41a1.

Moreover, after two optical function plates 21, 22 (FIG. 1) having different sizes are fitted into the first and second stepped portions 41a1, 41a2 from the front surface 41a of the first frame 41L, the adhesives (not shown) are charged in four paste margin portions 41a3 to thereby bond two optical function plates 21, 22 (FIG. 1). Needless to say, when only one optical function plate is attached to the front surface 41a of the first frame 41L, the plate may be fitted into only one of the first and second stepped portions 41a1, 41a2.

Furthermore, in a middle portion of a rear surface 41b of the first frame 41L, an opening 41b1 having an aperture function for passing the light is opened into a rectangular shape having one size smaller than the first stepped portion 41a1 formed in the inner peripheral portion of the front surface 41a, and thicknesses of the first stepped portion 41a1 and the rear surface 41b are set to be small.

Additionally, on an upper surface 41c of the first frame 41L, a bonding flange portion 41c1 is horizontally formed along the upper surface 41c protruding behind the rear surface 41b on the opposite side of the front surface 41a. Moreover, in the side surfaces of the bonding flange portion 41c1 behind the rear surface 41b, concave grooves 41c1-1, 41c1-2 for charging the adhesives (not shown) on the side of the first polarization beam splitter 11 are formed while rear ends of the grooves are opened.

Moreover, in the same manner as described above, on a lower surface 41d of the first frame 41L, a bonding flange portion 41d1 is horizontally formed along the lower surface 41*d* protruding behind the rear surface 41*b*. Moreover, in the side surfaces of the bonding flange portion 41*d*1 behind the rear surface 41*b*, concave grooves 41*d*1-1, 41*d*1-2 for charging the adhesives (not shown) on the side of the first polarization beam splitter 11 are formed while rear ends of the grooves are opened.

Furthermore, in the same manner as described above, on a left-side surface 41*e* of the first frame 41L, a bonding flange portion 41*e*1 is vertically formed along the left surface 41*e* protruding behind the rear surface 41*b*. Moreover, in vertical side surfaces of the bonding flange portion 41*e*1 behind the rear surface 41*b*, concave grooves 41*e*1-1, 41*e*1-2 for charging the adhesives (not shown) on the side of the first polarization beam splitter 11 are formed while rear ends of the grooves are opened.

It is to be noted that any bonding flange portion is not formed on a right-side surface 41*f* of the first frame 41L.

Moreover, the adhesives (not shown) are charged into the respective concave grooves 41*c*1-1, 41*c*1-2, 41*d*1-1, 41*d*1-2, 41*e*1-1, 41*e*1-2 of the bonding flange portions 41*c*1, 41*d*1, 41*e*1 formed in the upper surface 41*c*, lower surface 41*d*, and left-side surface 41*e* of the first frame 41L, and accordingly the first frame 41L is bonded to the first polarization beam splitter 11 on the light source side.

On the other hand, as shown in FIG. 5B, on the right-side surface 41*f* of the first frame 41R attached to the light emission surface of the fourth polarization beam splitter 14, a bonding flange portion 41*f*1 is vertically formed along the right-side surface 41*f* protruding behind the rear surface 41*b*. Moreover, in vertical side surfaces of the bonding flange portion 41*f*1 behind the rear surface 41*b*, concave grooves 41*f*1-1, 41*f*1-2 for charging the adhesives (not shown) on the side of the fourth beam splitter 14 are formed while rear ends of the grooves are opened. This respect is different from the first frame 41L. Although not described in detail, the first frame 41R is bonded to the fourth polarization beam splitter 14 on the projection lens side. It is to be noted that when the first frame 41L is vertically reversed, the shape of the first frame 41R is obtained. Therefore, the first frame 41R does not have to be separately prepared. The first frame 41L or the first frame 41R only may be used in common with respect to the first and fourth polarization beam splitters 11, 14.

Next, the second frames 42L, 42R for use in attaching various optical function plates to the predetermined gaps S (FIGS. 4A and 4B) formed between the facing surfaces of the polarization beam splitters (11 to 14) will be described with reference to FIGS. 7A and 7B, 8A to 8H.

Figure 7A:
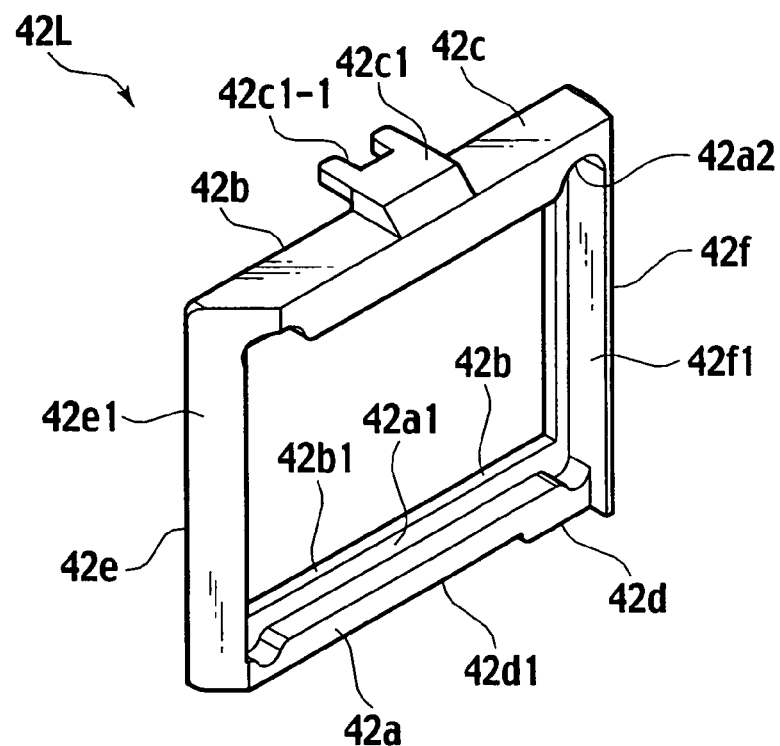
FIGS. 7A and 7B are enlarged perspective views showing second frames 42L, 42R.
Figure 7B:
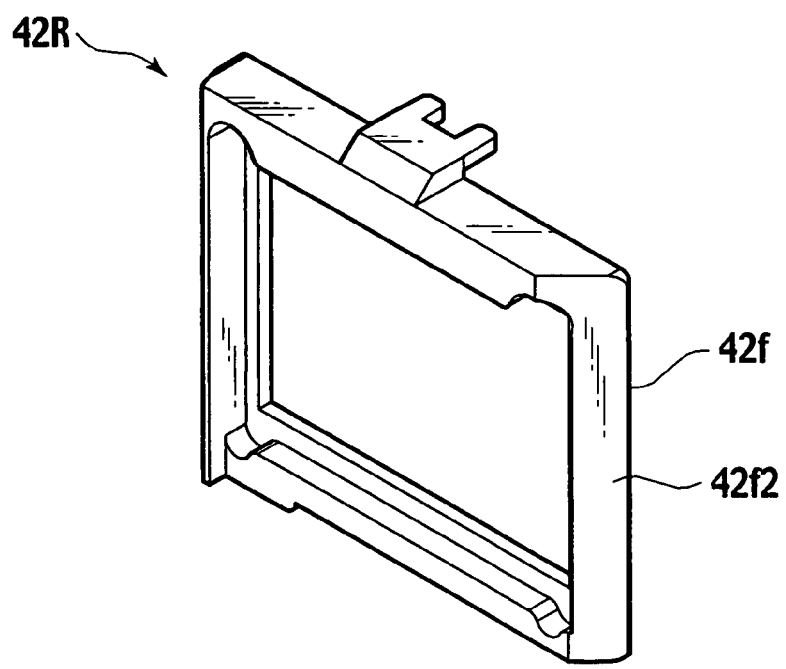

FIGS. 7A and 7B are enlarged perspective views showing the second frames 42L, 42R. FIGS. 8A to 8H are top plan view, front view, left-side view, rear view, Y—Y sectional view, X—X sectional view, part-A enlarged view, and bottom plan view showing the second frame 42L.

As shown in FIGS. 7A and 7B, the second frames 42L, 42R are also formed into substantially rectangular frame shapes using a black resin material having a thermal expansion coefficient substantially equal to that of the optical function plate, and are formed into one size larger vertical/horizontal dimensions as compared with those of the small-sized second and third polarization beam splitters 12, 13. The second frames 42L, 42R are different from each other only in that only tapered surfaces are symmetrically formed for allowing the frames 42L, 42R to cross each other at right angles, when the frames are inserted into the predetermined gaps S (FIGS. 4A and 4B) formed between the facing surfaces of the polarization beam splitters (11 to 14) as described above with respect to FIGS. 4A and 4B, and other portions are formed into the same shapes.

Moreover, as described later, the second frame 42L is inserted between the first and second polarization beam splitters 11, 12, and between the third and fourth polarization beam splitters 13, 14. On the other hand, the second frame 42R is inserted between the second and fourth polarization beam splitters 12, 14, and between the first and third polarization beam splitters 11, 13.

That is, as shown in FIGS. 7A, 8A to 8H, in the second frame 42L, a stepped portion 42*a*1 is opened into a rectangular frame shape in accordance with an optical function plate having a predetermined outer dimension in a peripheral portion of a front surface 42*a*. Moreover, four paste margin portions 42*a*2 for the adhesives are formed in upper/lower/right/left corner portions of the stepped portion 42*a*1. Furthermore, after one optical function plate is fitted into the stepped portion 42*a*1 from the front surface 42*a* of the second frame 42L, the adhesives (not shown) are charged in four paste margin portions 42*a*2 to thereby bond one optical function plate.

In this case, a depth of the stepped portion 42*a*1 of the second frame 42L is set to be larger than the thickness of the optical function plate to be bonded to the stepped portion, and accordingly a part of the polarization beam splitter (11 to 14) facing the optical function plate can be inserted. Therefore, considerations can be taken in such a manner as to prevent the optical color separation and synthesis system 10 from being invaded by dust. Moreover, a slight space is set to be obtained between the surface of the inserted polarization beam splitter (11 to 14) and the optical function plate, and this can prevent temperature rise between the optical function plate and the polarization beam splitter (11 to 14). It is to be noted that the temperature rise occurs in the optical color separation and synthesis system 10 by the white light emitted from the light source unit.

Furthermore, in a middle portion of a rear surface 42*b* of the second frame 42L, an opening 42*b*1 having an aperture function for passing the light is opened into a rectangular shape having one size smaller than the stepped portion 42*a*1 formed in the peripheral portion of the front surface 42*a*, and thickness between the stepped portion 42*a*1 and the rear surface 421*b* are set to be small.

Additionally, on an upper surface 42*c* of the second frame 42L, a bonding flange portion 42*c*1 is horizontally formed protruding behind the rear surface 42*b* on the opposite side of the front surface 42*a*. Moreover, in upper bonding flange portion 42*c*1, a concave grooves 42*c*1-1 for charging the adhesive (not shown) is formed while a rear end of the groove is opened. The adhesive (not shown) is charged into the concave groove 42*c*1-1, and accordingly the second frame 42L is bonded to the upper surface of the first polarization beam splitter 11 or the fourth polarization beam splitter 14.

Furthermore, a lower surface 42*d* of the second frame 42L is cut out to be shallow upwards on the side of a left-side surface 42*e* to thereby form a cutout portion 42*d*1. This cutout portion 42*d*1 functions as a relief for avoiding a sticking-out portion of the ultraviolet setting resin adhesive 16 in a case where the ultraviolet setting resin adhesive 16 sticks out into the predetermined gap S formed between the facing surfaces of the polarization beam splitters (11 to 14) on the base platform 15, when the first to fourth polarization beam splitters 11 to 14 are bonded onto the base platform 15 using the ultraviolet setting resin adhesive 16 as described above with reference to FIGS. 4A and 4B.

Moreover, on the left-side surface 42*e* of the second frame 42L, a tapered surface 42*e*1 is formed inside the front surface 42*a*, and into an opened state with respect to the front surface 42a. This tapered surface 42e1 is formed in such a manner that the second frame 42L can cross the second frame 42R at right angles, when the tapered surface abuts on a tapered surface 42f2 formed on a right-side surface 42f of the second frame 42R shown in FIG. 7B as described later.

Furthermore, a stopper surface 42f1 is formed on the right-side surface 42f of the second frame 42L. This stopper surface 42f1 abuts on the side surface of the positioned optical function plate. Moreover, as described later, when the second frame 42L is inserted into the predetermined gap S from the tapered surface 42e1 on the base platform 15 described above with reference to FIGS. 4A and 4B, the side surface of the second polarization beam splitter 12 or the third polarization beam splitter 13 is positioned to thereby abut on the stopper surface 42f1.

Additionally, as enlarged and shown in FIG. 8G, a stepped portion 42b2 slightly indented inside the rear surface 42b is formed in the rear surface 42b in the vicinity of the tapered surface 42e1 formed on the left-side surface 42e of the second frame 42L. This stepped portion 42b2 functions as a relief for preventing the side surface of the first polarization beam splitter 11 or the fourth polarization beam splitter 14 from being damaged, when the second frame 42L is inserted along the first or fourth polarization beam splitter 11, 14.

On the other hand, as shown in FIG. 7B, since the second frame 42R is different from the second frame 42L only in that the tapered surface 42f2 is formed on the right-side surface 42f as described above, detailed description thereof is omitted. The second frame 42R is also bonded to the upper surface of the first polarization beam splitter 11 or the fourth polarization beam splitter 14.

It is to be noted that to bond two optical function plates to the second frames 42L, 42R, the first and second stepped portions having different sizes may be formed into frame shapes on the front surface 42a in the same manner as in the first frames 41L, 41R.

Furthermore, in Embodiment 1, the respective bonding flange portions 42c1 formed on the upper surfaces 42c of the second frames 42L, 42R are formed in such a manner as to be bonded to the upper surface of the first polarization beam splitter 11 or the fourth polarization beam splitter 14, but the present invention is not limited to this embodiment. The second frames 42L, 42R may be attached to any of the first to fourth polarization beam splitters 11 to 14.

Here, the constructing of the optical color separation and synthesis system 10 of Embodiment 1 according to the present invention will be described with reference to FIGS. 9 to 13.

Figure 10A:
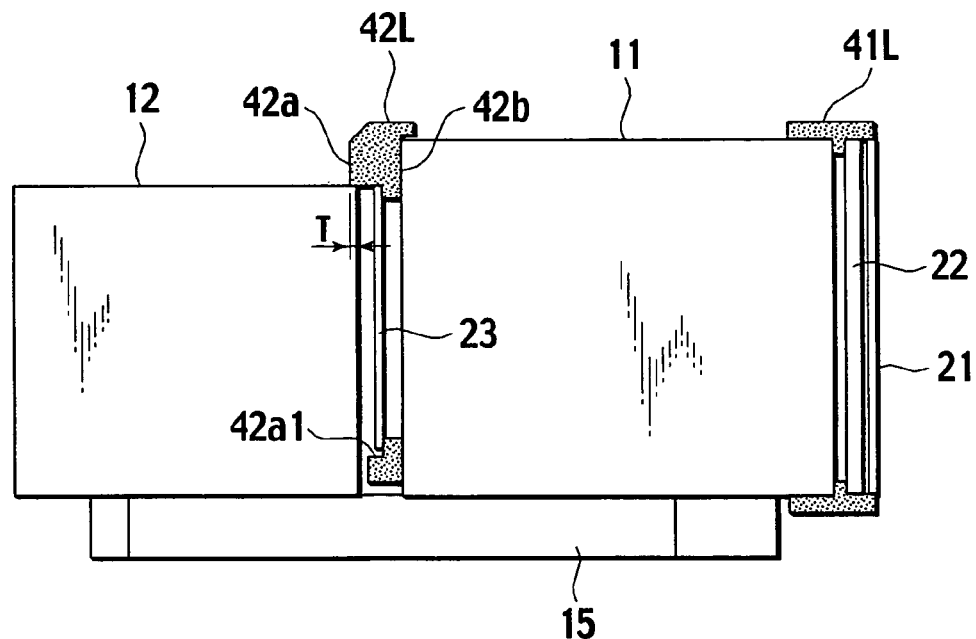
FIGS. 10A and 10B are sectional view and perspective view showing that the first and second frames are attached to the first polarization beam splitter.
Figure 10B:
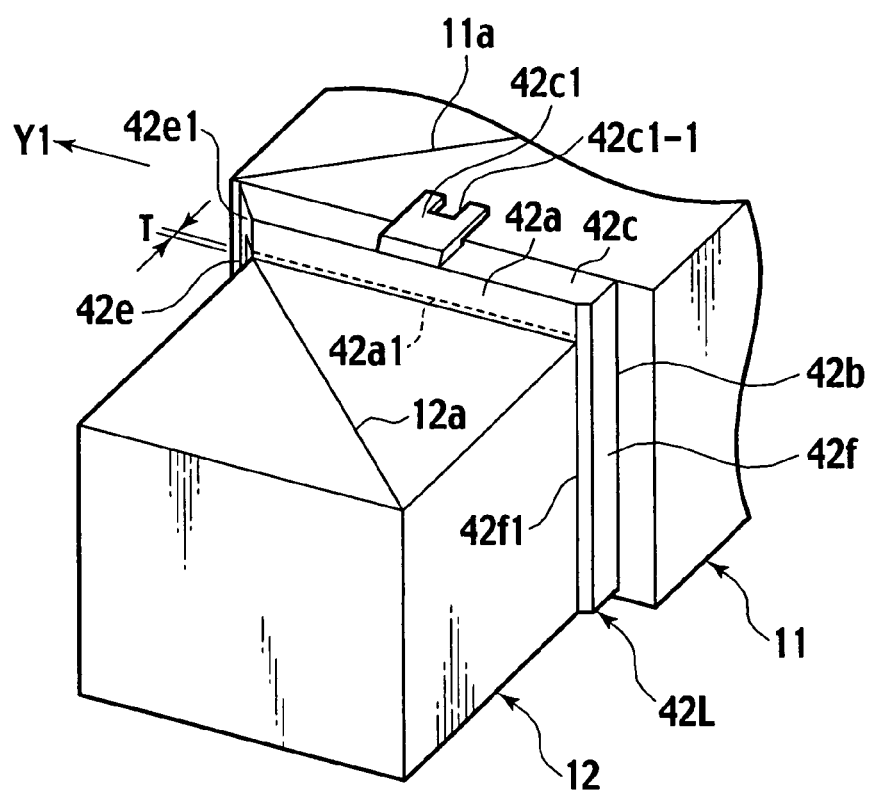
Figure 11:
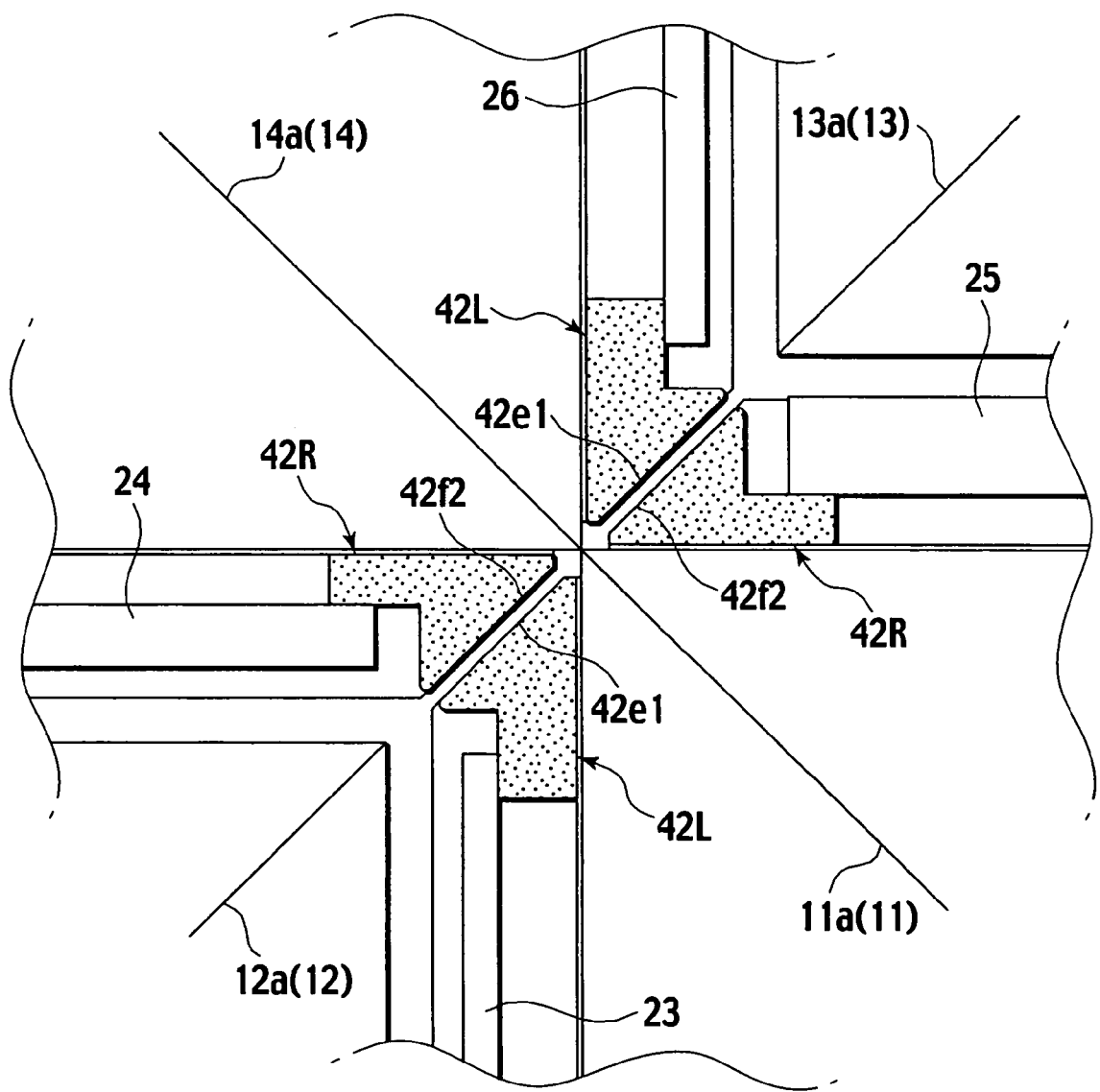
FIG. 11 is an enlarged plan view showing that tapered surfaces of four second frames intersect with one another in an X-shape.
Figure 12:
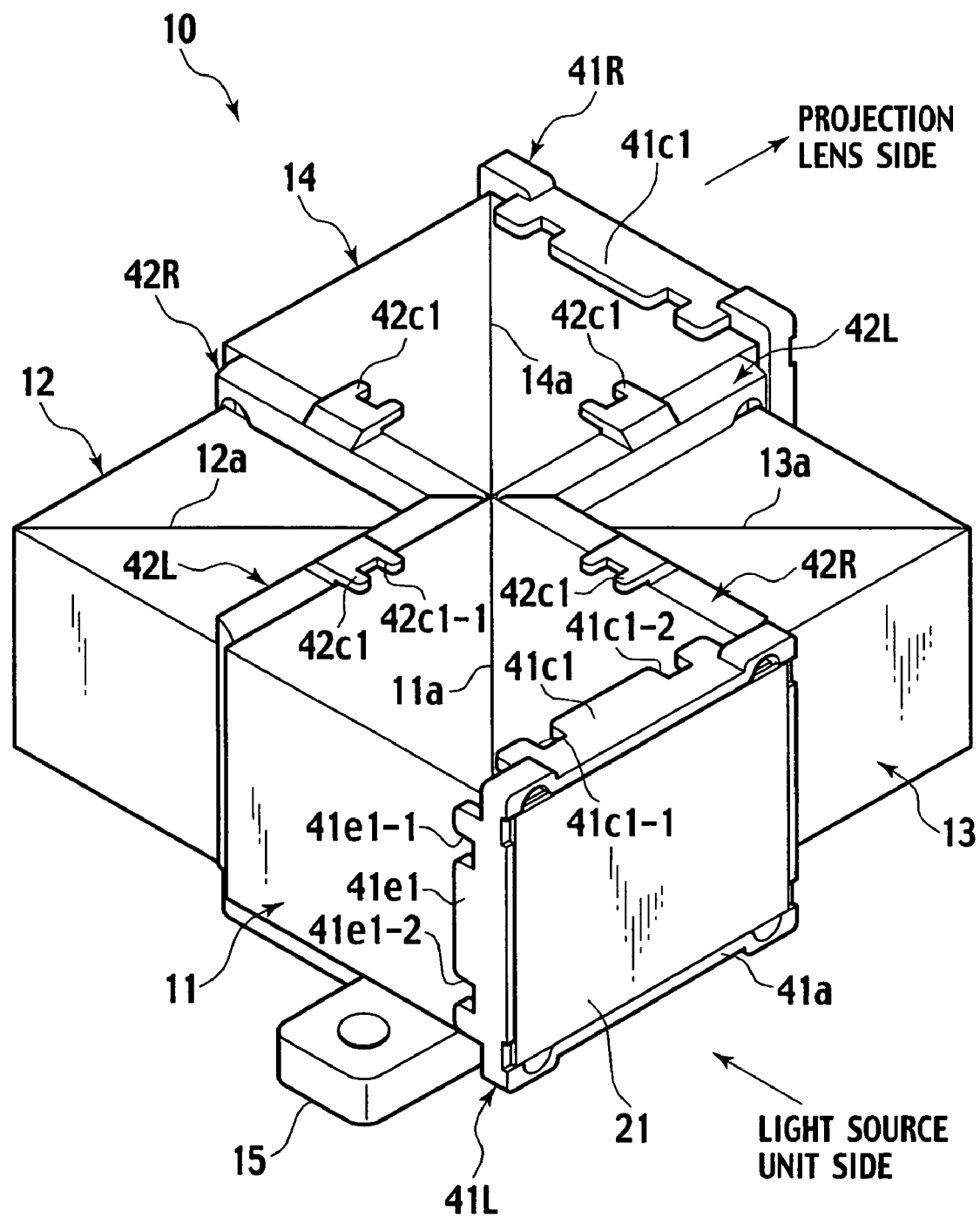
FIG. 12 is a perspective view showing that the optical color separation and synthesis system of Embodiment 1 according to the present invention is constructed.
Figure 13:
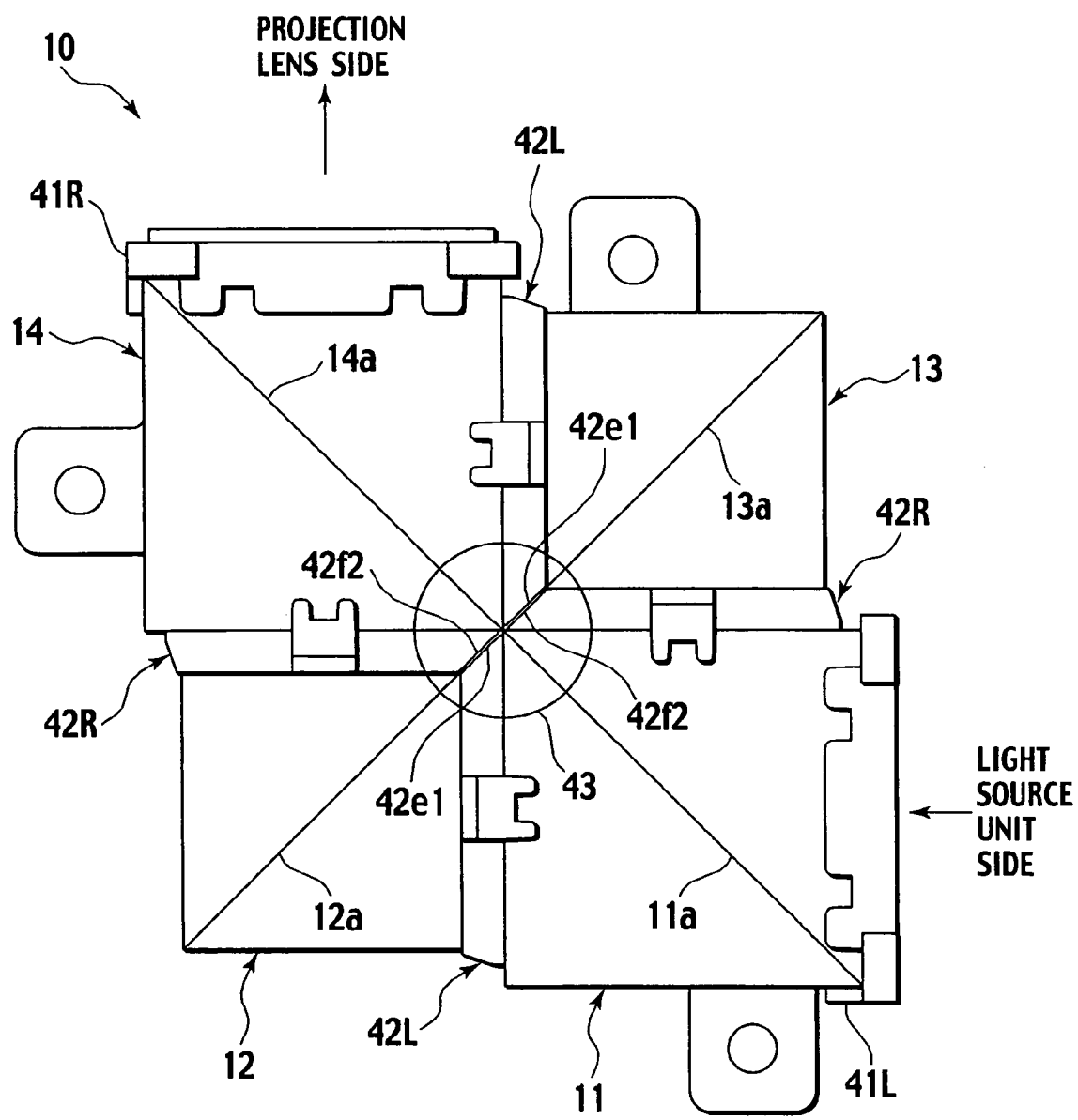
FIG. 13 is a plan view showing that a transparent seal is attached to the upper surfaces of four second frames whose tapered surfaces intersect with one another in the X-shape in the optical color separation and synthesis system of Embodiment 1 according to the present invention.

FIG. 9 is a partially sectional plan view showing that the optical color separation and synthesis system of Embodiment 1 according to the present invention is constructed. FIGS. 10A and 10B are sectional view and perspective view showing that the first and second frames are attached to the first polarization beam splitter. FIG. 11 is an enlarged plan view showing that tapered surfaces of four second frames intersect with one another in an X-shape. FIG. 12 is a perspective view showing that the optical color separation and synthesis system of Embodiment 1 according to the present invention is constructed. FIG. 13 is a plan view showing that a transparent seal is attached to the upper surfaces of four second frames whose tapered surfaces intersect with one another in the X-shape in the optical color separation and synthesis system of Embodiment 1 according to the present invention.

First, as shown in FIG. 9, the four first to fourth polarization beam splitters 11 to 14 are arranged in such a manner that the polarization separating surfaces 11a to 14a of the respective polarization beam splitters (11 to 14) form an X-shape as viewed from the upper surfaces of the splitters. Moreover, the predetermined gap S is formed between the facing surfaces of the polarization beam splitters (11 to 14), while the splitters are bonded onto the base platform 15. Thereafter, the second frames 42L, 42R to which the optical function plate has been secured are inserted in the predetermined gap S, and the second frames 42L, 42R are bonded to the upper surface of either the first polarization beam splitter 11 or the fourth polarization beam splitter 14.

This will be concretely described. The second frame 42L to which the polarization transforming plate 23 for G has been bonded is inserted from the tapered surface 42e1 between the first and second polarization beam splitters 11, 12 toward an arrow Y1 direction from the respective side surfaces of the first and second polarization beam splitters 11, 12, and the second frame 42L is bonded to the upper surface of the first polarization beam splitter 11.

Moreover, the second frame 42R to which the polarization transforming plate 24 for R has been bonded is inserted from the tapered surface 42f2 between the second and fourth polarization beam splitters 12, 14 toward an arrow X1 direction from the side surfaces of the second and fourth polarization beam splitters 12, 14, and the second frame 42R is bonded to the upper surface of the fourth polarization beam splitter 14.

Furthermore, the second frame 42R to which the half-wavelength plate 25 has been bonded is inserted from the tapered surface 42f2 between the first and third polarization beam splitters 11, 13 toward an arrow X2 direction from the side surfaces of the first and third polarization beam splitters 11, 13, and the second frame 42R is bonded to the upper surface of the first polarization beam splitter 11.

Additionally, the second frame 42L to which the polarization transforming plate 26 for B has been bonded is inserted from the tapered surface 42e1 between the third and fourth polarization beam splitters 13, 14 toward an arrow Y2 direction from the side surfaces of the third and fourth polarization beam splitters 13, 14, and the second frame 42L is bonded to the upper surface of the fourth polarization beam splitter 14.

With the insertion of the second frames 42L, 42R, the bonding flange portions 42c1 formed on the upper surfaces 42c of the second frames 42L, 42R are inserted in such a manner as to abut on the upper surface of the large-sized first polarization beam splitter 11 or fourth polarization beam splitter 14. Moreover, the rear surfaces 42b of the second frames 42L, 42R are brought into close contact with the side surface of the first polarization beam splitter 11 or the fourth polarization beam splitter 14, and inserted. In this case, when the rear surfaces 42b of the second frames 42L, 42R are brought into close contact with the side surfaces of the first and fourth polarization beam splitters 11, 14, and inserted, the side surfaces of the first and fourth polarization beam splitters 11, 14 are not damaged. Because, on each rear surface 42b, the stepped portion 42b2 slightly indented behind the rear surface 42b is formed in a leading portion of an insertion direction as shown in FIGS. 8D and 8G.

In this case, for example, the second frame 42L to which the polarization transforming plate 23 for G has been bonded is inserted between the first and second polarization beam splitters 11, 12 as shown in FIGS. 10A and 10B. In this case, the leading tapered surface 42e1 in the arrow Y1 direction is opened with respect to the front surface 42a. Therefore, a part of the small-sized second polarization beam splitter 12 disposed facing the stepped portion 42a1 of the second frame 42L can overlap by a dimension T and enter the stepped portion 42a1 formed in the front surface 42a. Consequently, invasion of dust between the first and second polarization beam splitters 11, 12 is prevented, and the side surface of the second polarization beam splitter 12 abuts on the stopper surface 42f1 formed on the right-side surface 42f of the second frame 42L, and is positioned with respect to the insertion direction. Thereafter, the adhesive (not shown) is charged in the concave groove 42c1-1 of the bonding flange portion 42c1 protruded behind the rear surface 42b from the upper surface 42c of the second frame 42L to thereby bond the frame to the upper surface of the large-sized first polarization beam splitter 11.

Needless to say, also with regard to the second frames 42L, 42R, a part of the small-sized second polarization beam splitter 12 overlaps and enters the stepped portion 42a1 formed on the front surface 42a by the dimension T, and the second frames 42L, 42R are bonded to the upper surface of either the large-sized first polarization beam splitter 11 and fourth polarization beam splitter 14.

Moreover, when the second frames 42L, 42R are inserted between the facing surfaces of the polarization beam splitters (11 to 14), as enlarged and shown in FIG. 11, the tapered surfaces 42e1, 42f2 are arranged along the extension lines of the polarization separating surfaces 12a, 13a of the second and third polarization beam splitters 12, 13, and further four second frames 42L, 42R in total are arranged in such a manner as to cross one another at right angles.

Turning back to FIG. 9, after inserting the second frames 42L, 42R between the facing surfaces of the polarization beam splitters (11 to 14), the first frame 41L to which the notch filter plate 21 and polarization transforming plate 22 for B have been bonded is attached to the light incidence surface of the first polarization beam splitter 11. Moreover, the first frame 41R to which the ghost buster plate 27 has been bonded is attached to the light emission surface of the fourth polarization beam splitter 14.

In this case, as described above with reference to FIGS. 5A and 5B, the adhesives (not shown) are charged in the respective concave grooves 41c1-1, 41c1-2, 41d1-1, 41d1-2, 41e1-1, 41e1-2 (41f1-1, 41f1-2) of the bonding flange portions 41c1, 41d1, 41e1 (41f1) protruded behind the rear surface 41b on the upper surface 41c, lower surface 41d, left-side surface 41e (right-side surface 41f) of the first frame 41L to thereby bond the first frame 41L (41R) to the surface of the first (fourth) polarization beam splitter 11 (14).

Moreover, the first frames 41L, 41R and the second frames 42L, 42R are bonded to the first and fourth polarization beam splitters 11, 14, and constructed as shown in FIG. 12.

Furthermore, as shown in FIG. 13, after constructing the optical color separation and synthesis system 10, a transparent seal 43 is attached to the upper surfaces of the tapered surfaces 42e1, 42f2 while the four second frames 42L, 42R in total intersect with one another. Consequently, the optical color separation and synthesis system 10 is prevented from being invaded by the dust from above.

As described above, in the optical color separation and synthesis system 10 of Embodiment 1 according to the present invention, the four first to fourth polarization beam splitters 11 to 14 are arranged in such a manner that the polarization separating surfaces 11a to 14a of the polarization beam splitters form the X-shape when viewed from the upper surfaces. Moreover, the predetermined gap S is formed between the facing surfaces of the polarization beam splitters (11 to 14), and the lower surfaces 11c to 14c are bonded onto the base platform 15. Thereafter, the first frames 41L, 41R and the second frames 42L, 42R to which various optical function plates have been bonded are bonded to the large-sized first and fourth polarization beam splitters 11, 14. Therefore, various optical function plates can be attached to the first and fourth polarization beam splitters 11, 14 with good constructing properties, further optical characteristics of the optical color separation and synthesis system 10 can be satisfactorily maintained, and considerations are taken in such a manner as to prevent the optical color separation and synthesis system 10 from being invaded by the dust.

Here, Modifications 1 to 3 in which the above-described first frames 41L, 41R of the optical color separation and synthesis system 10 of Embodiment 1 are partially modulated will be described with reference to FIGS. 14A to 16C.

It is to be noted that in FIGS. 14A to 16C, only first frames 41L-(1) to 41L-(3) of Modifications 1 to 3 to be attached to the light incidence surface of the first polarization beam splitter 11 are shown. On the other hand, first frames 41R-(1) to 41R-(3) of Modifications 1 to 3 to be attached to the light emission surface of the fourth polarization beam splitter 14 may be formed symmetrically with respect to the first frames 41L-(1) to 41L-(3) of Modifications 1 to 3, and therefore description and drawing thereof are omitted.

Figure 14A:
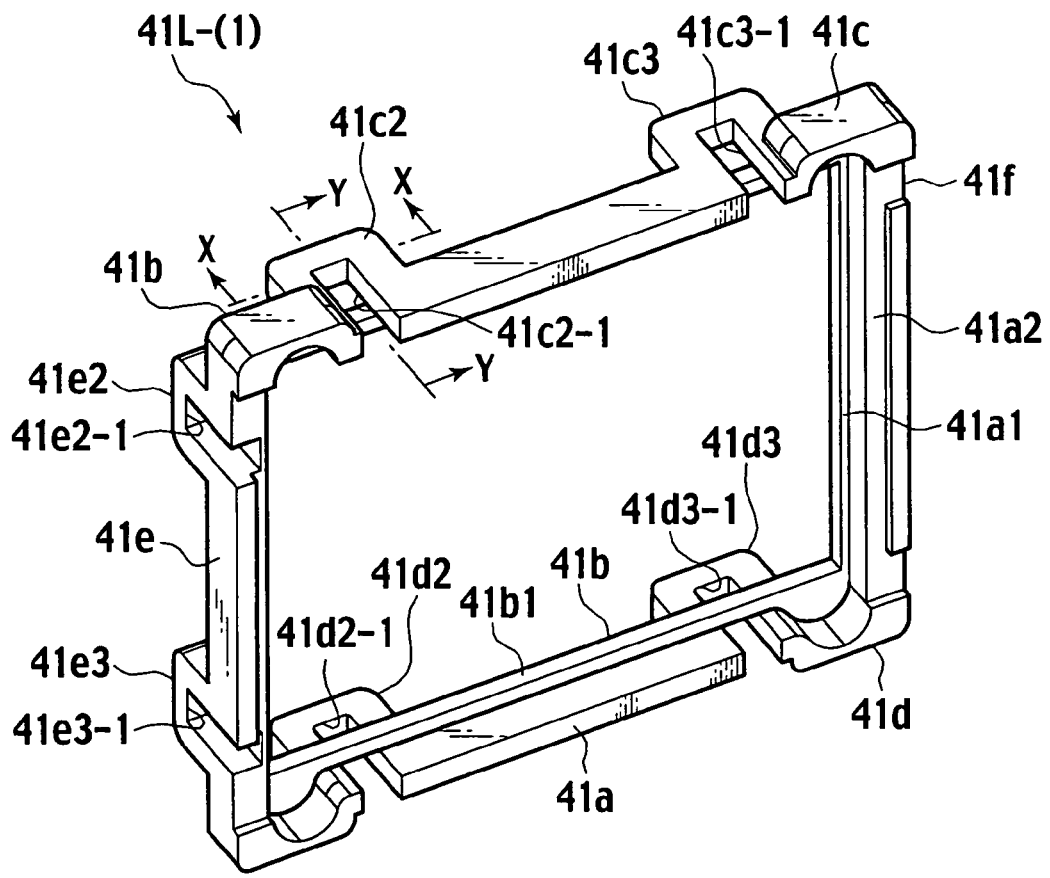
FIGS. 14A to 14C are explanatory views of a partially modified frame of Modification 1 in the optical color separation and synthesis system of Embodiment 1 according to the present invention.
Figure 14B:
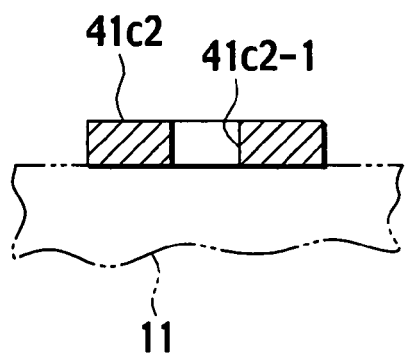
Figure 14C:
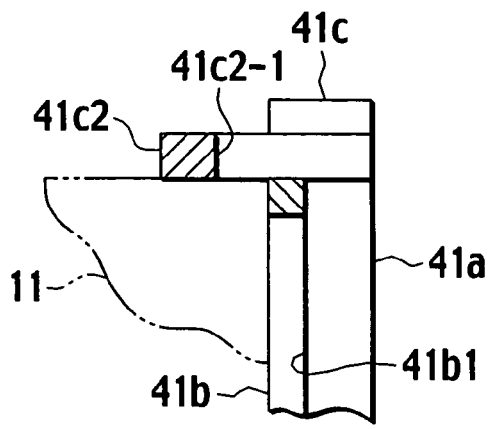
Figure 15A:
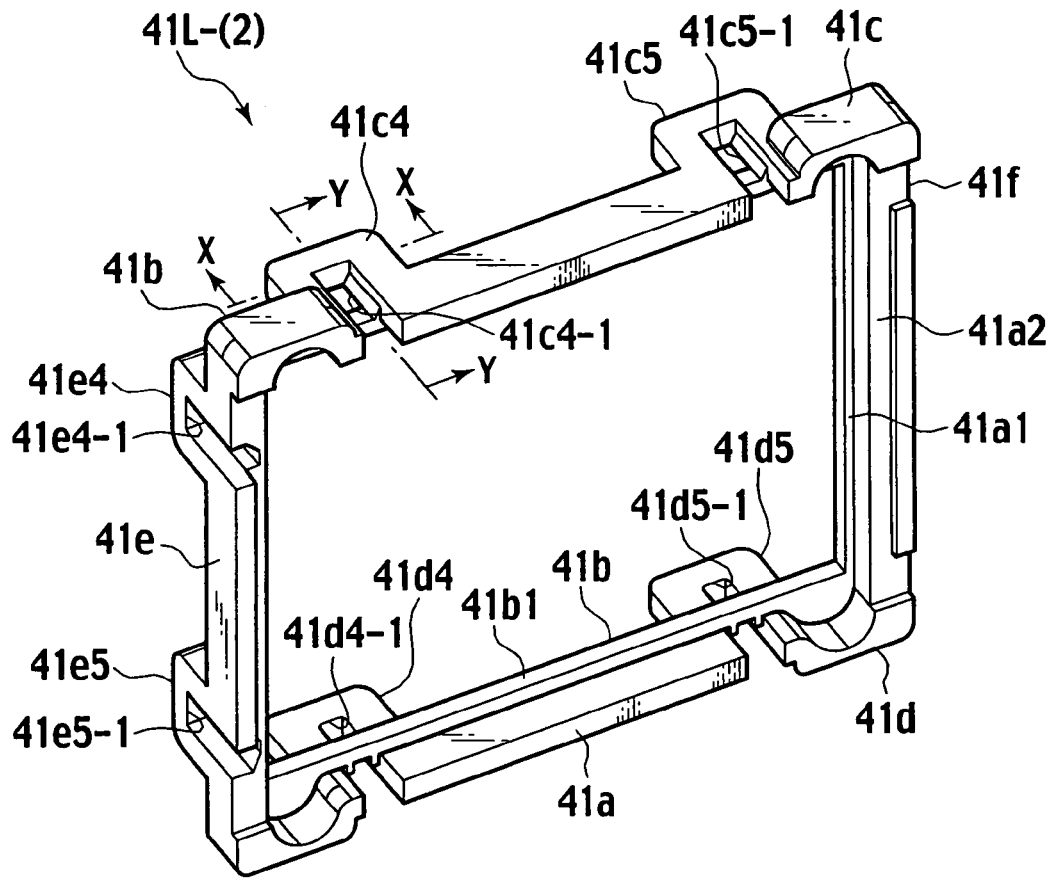
FIGS. 15A to 15C are explanatory views of the partially modified frame of Modification 2 in the optical color separation and synthesis system of Embodiment 1 according to the present invention.
Figure 15B:
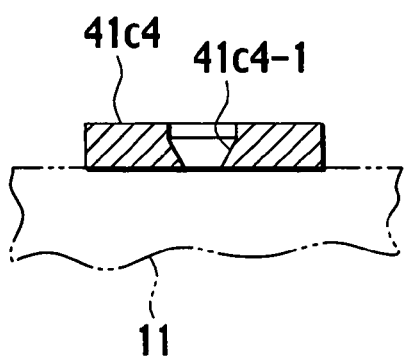
Figure 15C:
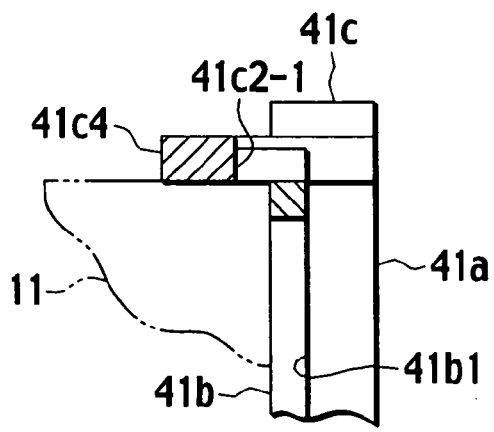
Figure 16A:
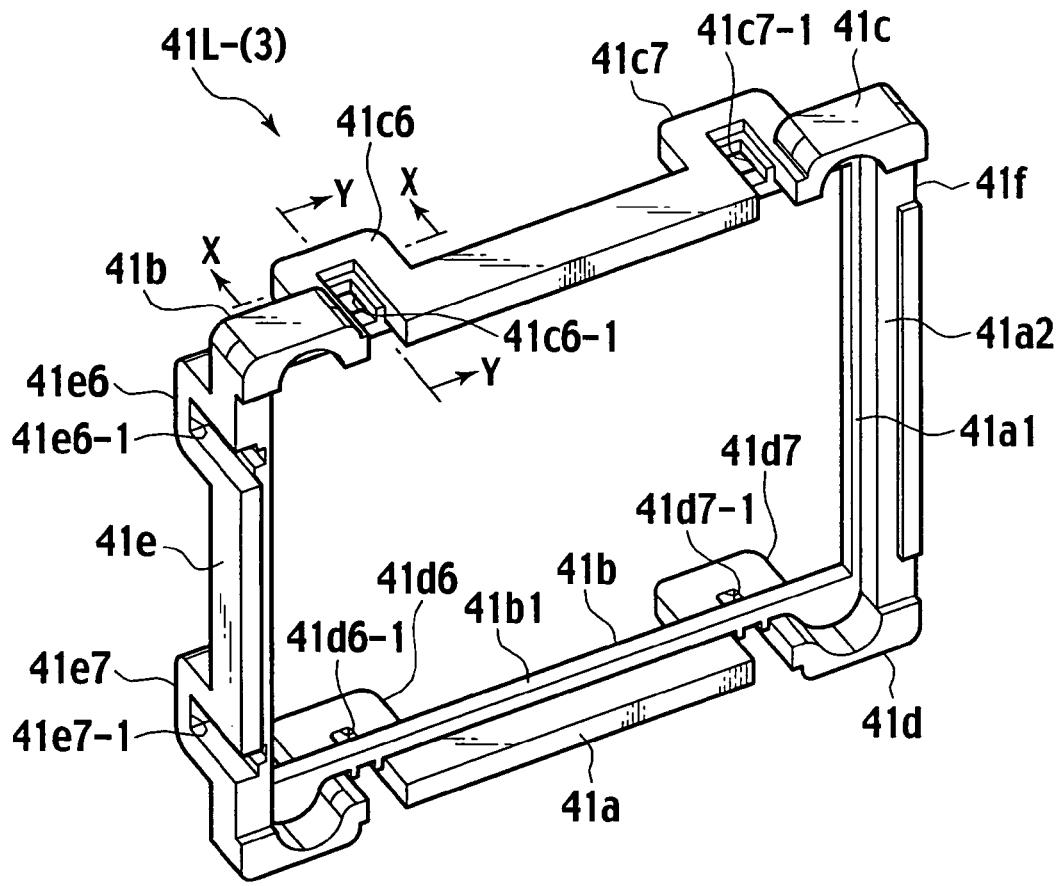
FIGS. 16A to 16C are explanatory views of the partially modified frame of Modification 3 in the optical color separation and synthesis system of Embodiment 1 according to the present invention.
Figure 16B:
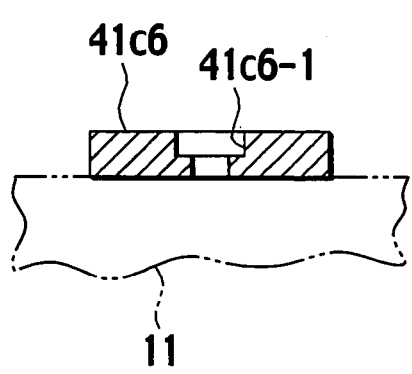
Figure 16C:
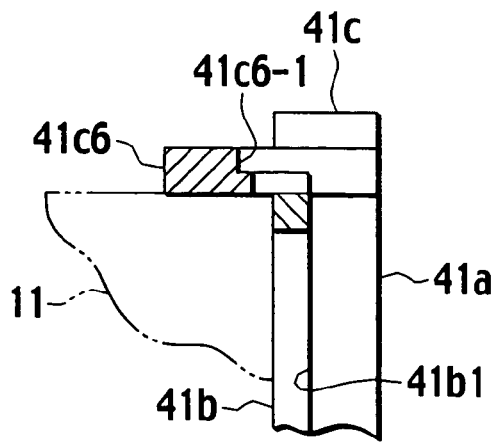

FIGS. 14A to 14C are explanatory views of a partially modified frame of Modification 1 in the optical color separation and synthesis system of Embodiment 1 according to the present invention, FIG. 14A is a perspective view, FIG. 14B is an X—X arrow sectional view, and FIG. 14C is a Y—Y arrow sectional view. FIGS. 15A to 15C are explanatory views of the partially modified frame of Modification 2 in the optical color separation and synthesis system of Embodiment 1 according to the present invention, FIG. 15A is a perspective view, FIG. 15B is an X—X arrow sectional view, and FIG. 15C is a Y—Y arrow sectional view. FIGS. 16A to 16C are explanatory views of the partially modified frame of Modification 3 in the optical color separation and synthesis system of Embodiment 1 according to the present invention, FIG. 16A is a perspective view, FIG. 16B is an X—X arrow sectional view, and FIG. 16C is a Y—Y arrow sectional view.

First, as shown in FIGS. 14A to 14C, the first frame 41L-(1) of Modification 1 is formed into a substantially rectangular frame shape using a black resin material having a thermal expansion coefficient equal to that of the optical function plate in the same manner as in the first frame 41L described above with reference to FIGS. 5A and 6A to 6F. Only respects different from those of the first frame 41L will be described.

On the upper surface 41c of the first frame 41L-(1) of Modification 1, bonding flange portions 41c2, 41c3 are horizontally separately formed protruding behind the rear surface 41b on the opposite side of the front surface 41a. Moreover, through holes 41c2-1, 41c3-1 for charging the adhesives (not shown) on the side of the first polarization beam splitter 11 are formed into rectangular shapes, extending through the bonding flange portions 41c2, 41c3 behind the rear surface 41b. In this case, in a mold, the through holes 41c2-1, 41c3-1 are indented into concave portions behind the bonding flange portions 41c2, 41c3 from the front surface 41a, and are accordingly formed into rectangular shapes extending through the bonding flange portions 41c2, 41c3 behind the rear surface 41b via the frame of the opening 41b1 formed into the rectangular shape in the rear surface 41b.

Moreover, in the same manner as described above, on the lower surface 41d of the first frame 41L-(1), bonding flange portions 41*d*2, 41*d*3 are horizontally separately formed protruding behind the rear surface 41*b*. Furthermore, through holes 41*d*2-1, 41*d*3-1 for charging the adhesives (not shown) on the side of the first polarization beam splitter 11 are formed into rectangular shapes, extending through the bonding flange portions 41*d*2, 41*d*3 behind the rear surface 41*b*.

Furthermore, in the same manner as described above, on the left-side surface 41*e* of the first frame 41L-(1), bonding flange portions 41*e*2, 41*e*3 are vertically separately formed protruding behind the rear surface 41*b*. Furthermore, through holes 41*e*2-1, 41*e*3-1 for charging the adhesives (not shown) on the side of the first polarization beam splitter 11 are formed into rectangular shapes, extending through the bonding flange portions 41*e*2, 41*e*3 behind the rear surface 41*b*.

Additionally, the adhesives (not shown) are charged in the through holes 41*c*2-1, 41*c*3-1, 41*d*2-1, 41*d*3-1, 41*e*2-1, 41*e*3-1 of the bonding flange portions 41*c*2, 41*c*3, 41*d*2, 41*d*3, 41*e*2, 41*e*3 formed on the upper surface 41*c*, lower surface 41*d*, left-side surface 41*e* of the first frame 41L-(1), and accordingly the first frame 41L-(1) is bonded to the first polarization beam splitter 11 on the light source side.

After bonding the first frame 41L to the first polarization beam splitter 11 on the light source side, assuming that the first frame 41L is intentionally peeled forwards. When a force is exerted in this manner, there is danger that the first frame 41L is peeled while the only adhesive (not shown) remains on the side of the first polarization beam splitter 11. This is because the rear end of each concave groove formed in each bonding flange portion for charging the adhesive is opened. On the other hand, in the first frame 41L-(1) of the modification, each through hole formed in each bonding flange portion for charging the adhesive extends on the side of the first polarization beam splitter 11. Therefore, there is not any danger that the only adhesive (not shown) remains on the side of the first polarization beam splitter 11, and adhesive strength of the first frame 41L-(1) to the first polarization beam splitter 11 can be enhanced.

Next, as shown in FIGS. 15A to 15C, the first frame 41L-(2) of Modification 2 is formed into a substantially rectangular frame shape using a black resin material having a thermal expansion coefficient equal to that of the optical function plate in the same manner as in the above-described first frame 41L and the first frame 41L-(1) of Modification 1. Only respects different from those of the first frame 41L and the first frame 41L-(1) of Modification 1 will be described.

On the upper surface 41*c* of the first frame 41L-(2) of Modification 2, bonding flange portions 41*c*4, 41*c*5 are horizontally separately formed protruding behind the rear surface 41*b* on the opposite side of the front surface 41*a*. Moreover, tapered through holes 41*c*4-1, 41*c*5-1 for charging the adhesives (not shown) on the side of the first polarization beam splitter 11 are formed extending through the bonding flange portions 41*c*4, 41*c*5 behind the rear surface 41*b*. In this case, in a mold, the tapered through holes 41*c*4-1, 41*c*5-1 are indented into concave portions behind the bonding flange portions 41*c*4, 41*c*5 from the front surface 41*a*, and are accordingly formed extending through the bonding flange portions 41*c*4, 41*c*5 behind the rear surface 41*b* via the frame of the opening 41*b*1 formed into the rectangular shape in the rear surface 41*b*.

Moreover, in the same manner as described above, on the lower surface 41*d* of the first frame 41L-(2), bonding flange portions 41*d*4, 41*d*5 are horizontally separately formed protruding behind the rear surface 41*b*. Furthermore, tapered through holes 41*d*4-1, 41*d*5-1 for charging the adhesives (not shown) on the side of the first polarization beam splitter 11 are formed extending through the bonding flange portions 41*d*4, 41*d*5 behind the rear surface 41*b*.

Furthermore, in the same manner as described above, on the left-side surface 41*e* of the first frame 41L-(2), bonding flange portions 41*e*4, 41*e*5 are vertically separately formed protruding behind the rear surface 41*b*. Furthermore, tapered through holes 41*e*4-1, 41*e*5-1 for charging the adhesives (not shown) on the side of the first polarization beam splitter 11 are formed extending through the bonding flange portions 41*e*4, 41*e*5 behind the rear surface 41*b*.

Additionally, the adhesives (not shown) are charged in the through holes 41*c*4-1, 41*c*5-1, 41*d*4-1, 41*d*5-1, 41*e*4-1, 41*e*5-1 of the bonding flange portions 41*c*4, 41*c*5, 41*d*4, 41*d*5, 41*e*4, 41*e*5 formed on the upper surface 41*c*, lower surface 41*d*, left-side surface 41*e* of the first frame 41L-(2), and accordingly the first frame 41L-(2) is bonded to the first polarization beam splitter 11 on the light source side.

Also in the first frame 41L-(2) of Modification 2, each tapered through hole formed in each bonding flange portion for charging the adhesive extends on the side of the first polarization beam splitter 11. Therefore, in the same manner as in the first frame 41L-(1) of Modification 1, there is not any danger that the only adhesive (not shown) remains on the side of the first polarization beam splitter 11, and adhesive strength of the first frame 41L-(2) to the first polarization beam splitter 11 can be enhanced.

Next, as shown in FIGS. 16A to 16C, the first frame 41L-(3) of Modification 3 is formed into a substantially rectangular frame shape using a black resin material having a thermal expansion coefficient equal to that of the optical function plate in the same manner as in the above-described first frame 41L, the first frame 41L-(1) of Modification 1, and the first frame 41L-(2) of Modification 2. Only respects different from those of the first frame 41L, the first frame 41L-(1) of Modification 1, and the first frame 41L-(2) of Modification 2 will be described.

On the upper surface 41*c* of the first frame 41L-(3) of Modification 3, bonding flange portions 41*c*6, 41*c*7 are horizontally separately formed protruding behind the rear surface 41*b* on the opposite side of the front surface 41*a*. Moreover, stepped through holes 41*c*6-1, 41*c*7-1 for charging the adhesives (not shown) on the side of the first polarization beam splitter 11 are formed extending through the bonding flange portions 41*c*6, 41*c*7 behind the rear surface 41*b*. In this case, in a mold, the stepped through holes 41*c*6-1, 41*c*7-1 are indented into concave portions with horizontal/vertical stepped portions behind the bonding flange portions 41*c*6, 41*c*7 from the front surface 41*a*, and are accordingly formed extending through the bonding flange portions 41*c*6, 41*c*7 behind the rear surface 41*b* via the frame of the opening 41*b*1 formed into the rectangular shape in the rear surface 41*b*.

Moreover, in the same manner as described above, on the lower surface 41*d* of the first frame 41L-(3), bonding flange portions 41*d*6, 41*d*7 are horizontally separately formed protruding behind the rear surface 41*b*. Furthermore, stepped through holes 41*d*6-1, 41*d*7-1 for charging the adhesives (not shown) on the side of the first polarization beam splitter 11 are formed extending through the bonding flange portions 41*d*6, 41*d*7 behind the rear surface 41*b*.

Furthermore, in the same manner as described above, on the left-side surface 41*e* of the first frame 41L-(3), bonding flange portions 41*e*6, 41*e*7 are vertically separately formed protruding behind the rear surface 41*b*. Furthermore, stepped through holes 41*e*6-1, 41*e*7-1 for charging the adhesives (not shown) on the side of the first polarization beam splitter 11 are formed extending through the bonding flange portions 41e6, 41e7 behind the rear surface 41b.

Additionally, the adhesives (not shown) are charged in the stepped through holes 41c6-1, 41c7-1, 41d6-1, 41d7-1, 41e6-1, 41e7-1 of the bonding flange portions 41c6, 41c7, 41d6, 41d7, 41e6, 41e7 formed on the upper surface 41c, lower surface 41d, left-side surface 41e of the first frame 41L-(3), and accordingly the first frame 41L-(3) is bonded to the first polarization beam splitter 11 on the light source side.

Also in the first frame 41L-(3) of Modification 3, each stepped through hole formed in each bonding flange portion for charging the adhesive extends on the side of the first polarization beam splitter 11. Therefore, in the same manner as in the first frames 41L-(1), 41L-(2) of Modifications 1, 2, there is not any danger that the only adhesive (not shown) remains on the side of the first polarization beam splitter 11, and adhesive strength of the first frame 41L-(3) to the first polarization beam splitter 11 can be enhanced.

<Embodiment 2>

Figure 18:
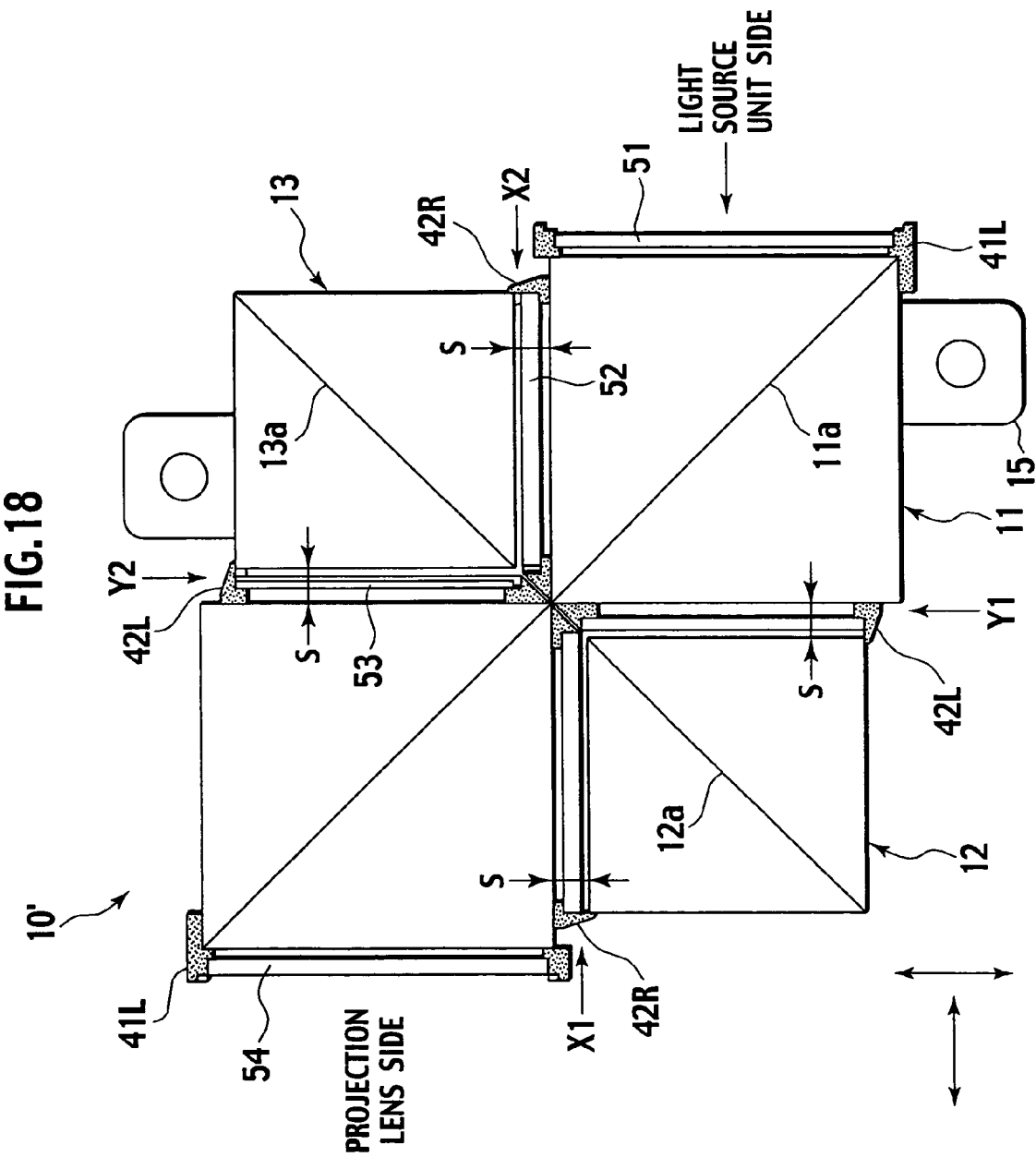
FIG. 18 is a partially sectional plan view showing that the optical color separation and synthesis system of Embodiment 2 according to the present invention is constructed.

FIG. 17 is a principle diagram of an optical color separation and synthesis system of Embodiment 2 according to the present invention. FIG. 18 is a partially sectional plan view showing that the optical color separation and synthesis system of Embodiment 2 according to the present invention is constructed.

An optical color separation and synthesis system 10' of Embodiment 2 shown in FIGS. 17 and 18 is different from the above-described optical color separation and synthesis system 10 of Embodiment 1 in arrangements of various optical function plates and reflective type spatial light modulation elements (reflective type liquid crystal panels) 30R, 30G, 30B. For the sake of convenience of the description, the above-described constituting members are denoted with the same reference numerals, and constituting members different from those of Embodiment 1 will be denoted with new reference numerals and described.

As shown in FIG. 17, in the same manner as in Embodiment 1, in the optical color separation and synthesis system 10' of Embodiment 2 according to the present invention, four first to fourth polarization beam splitters 11 to 14 are arranged in such a manner that polarization separating surfaces 11a to 14a of the respective polarization beam splitters form an X-shape in a plane manner as viewed from upper surfaces.

In this case, in the plan view of FIG. 17, the second polarization beam splitter 12 is disposed on the left side of the first polarization beam splitter 11. Moreover, the third polarization beam splitter 13 is disposed above the first polarization beam splitter 11, and the fourth polarization beam splitter 14 is disposed above the second polarization beam splitter 12 and on the left side of the third polarization beam splitter 13. Furthermore, unlike Embodiment 1, a light incidence surface of the first polarization beam splitter 11 extends in parallel with a light emission surface of the fourth polarization beam splitter 14 by arrangement relations of various optical function plates 51 to 54 and reflective type liquid crystal panels 30R, 30G, 30B.

Moreover, in the same manner as in Embodiment 1, the first polarization beam splitter 11 which white light enters on the light source unit side, and the fourth polarization beam splitter 14 which emits color synthesized light on the projection lens side are formed into large sizes. Moreover, the respective polarization separating surfaces 11a, 14a of the first and fourth polarization beam splitters 11, 14 are diagonally arranged. The second and third polarization beam splitters 12, 13 are formed to be one size smaller than the first and fourth polarization beam splitters 11, 14. Moreover, the respective polarization separating surfaces 12a, 13a of the second and third polarization beam splitters 12, 13 are diagonally arranged in such a manner as to cross the polarization separating surfaces 11a, 14a of the first and fourth polarization beam splitters 11, 14 at right angles.

Furthermore, on the respective polarization separating surfaces 11a to 14a of the first to fourth polarization beam splitters 11 to 14, in the same manner as in Embodiment 1, a translucent/reflective polarization film which transmits p-polarized light and reflects s-polarized light is formed along a diagonal line of a rectangular parallelepiped shape.

Here, respects different from those of Embodiment 1 will be described. A reflective type liquid crystal panel 30G for G is disposed facing the left-side surface of the small-sized second polarization beam splitter 12. Moreover, a reflective type liquid crystal panel 30R for R and a reflective type liquid crystal panel 30B for B are arranged facing upper surface and right-side surface of the small-sized third polarization beam splitter 13 in such a manner as to cross each other at right angles. The reflective type liquid crystal panels 30R, 30G, 30B are miniaturized in accordance with sizes of the second and third polarization beam splitters 12, 13.

Moreover, a wavelength selecting polarization transforming plate (hereinafter referred to as the polarization transforming plate for G) 51 having a function of rotating a polarization plane of G light by 90° is disposed beside the light incidence surface of the first polarization beam splitter 11 on the light source unit side. A wavelength selecting polarization transforming plate (hereinafter referred to as the polarization transforming plate for R) 52 having a function of rotating the polarization plane of R light by 90° is disposed between the first polarization beam splitter 11 and the third polarization beam splitter 13. A wavelength selecting polarization transforming plate (hereinafter referred to as the polarization transforming plate for R) 53 having a function of rotating the polarization plane of R light by 90° is disposed between the third polarization beam splitter 13 and the fourth polarization beam splitter 14. A wavelength selecting polarization transforming plate (hereinafter referred to as the polarization transforming plate for G) 54 having a function of rotating the polarization plane of G light by 90° is disposed beside the light emission surface of the fourth polarization beam splitter 14 on the light source side.

Among the respective constituting members, the polarization transforming plate 51 for G, the polarization transforming plate 52 for R, the polarization transforming plate 53 for R, and the polarization transforming plate 54 for G have inherent optical functions in transmitting the light, and therefore they will be sometimes generically referred to as the light transmitting type optical function plates.

In this case, in Embodiment 2, any optical function plate is not disposed between the first and second polarization beam splitters 11, 12, or between second and forth polarization beam splitters 12, 14. Therefore, the optical function plate may be disposed between the facing surfaces of the polarization beam splitters (11 to 14) if necessary.

Moreover, when the white light comprising Rs, Gs, and Bs beams of s-polarized light obtained from a light source unit enters the first polarization beam splitter 11 from the light incidence surface, the color synthesized light obtained by synthesizing Rp, Gp, and Bp beams of p-polarized light is emitted on the projection lens side from the light emission surface of the fourth polarization beam splitter 14 through shown light paths.

Next, to construct the optical color separation and synthesis system 10' of Embodiment 2, as shown in FIG. 18, the four first to fourth polarization beam splitters 11 to 14 are arranged in such a manner that the polarization separating surfaces 11a to 14a of the polarization beam splitters form the X-shape when viewed from the upper surfaces. A predetermined gap S is formed between the facing surfaces of the polarization beam splitters (11 to 14), and the splitters are bonded onto a base platform 15. Thereafter, second frames 42L, 42R are inserted in the predetermined gap S, and bonded to the upper surface of either the first polarization beam splitter 11 or the fourth polarization beam splitter 14.

This will be concretely described. The vacant second frame 42L to which any optical function plate has not been bonded is inserted between the first and second polarization beam splitters 11, 12 from an arrow Y1 direction, and the second frame 42L which does not have any optical function plate is bonded to the upper surface of the first polarization beam splitter 11.

Moreover, the vacant second frame 42R to which any optical function plate has not been bonded is inserted between the second and fourth polarization beam splitters 12, 14 from an arrow X1 direction, and the second frame 42R which does not have any optical function plate is bonded to the upper surface of the fourth polarization beam splitter 14.

Furthermore, the second frame 42R to which the polarization transforming plate 52 for R has been bonded is inserted between the first and third polarization beam splitters 11, 13 from an arrow X2 direction, and the second frame 42R including the optical function plate is bonded to the upper surface of the first polarization beam splitter 11.

Additionally, the second frame 42L to which the polarization transforming plate 53 for R has been bonded is inserted between the third and fourth polarization beam splitters 13, 14 from an arrow Y2 direction, and the second frame 42L including the optical function plate is bonded to the upper surface of the fourth polarization beam splitter 14.

The second frames 42L, 42R to which the optical function plates have been bonded are appropriately combined with the vacant second frames 42L, 42R to which any optical function plate has not been bonded, and the frames are arranged between the facing surfaces of the polarization beam splitters (11 to 14) in such a manner as to cross one another at right angles.

Moreover, after inserting the second frames 42L, 42R between the facing surfaces of the polarization beam splitters (11 to 14), the first frame 41L to which the polarization transforming plate 51 for G has been bonded is attached to the light incidence surface of the first polarization beam splitter 11. Furthermore, the first frame 41L to which the polarization transforming plate 54 for G has been bonded is attached to the light emission surface of the fourth polarization beam splitter 14.

Therefore, in the above-described optical color separation and synthesis system 10' of Embodiment 2 according to the present invention, in substantially the same manner as in Embodiment 1, the four first to fourth polarization beam splitters 11 to 14 are arranged in such a manner that the polarization separating surfaces 11a to 14a of the polarization beam splitters form the X-shape when viewed from the upper surfaces. Moreover, the predetermined gap S is formed between the facing surfaces of the polarization beam splitters (11 to 14), and the lower surfaces 11c to 14c are bonded onto the base platform 15. Thereafter, the first frames 41L, 41R to which various optical function plates have been bonded, and the second frames 42L, 42R including no optical function plate, and including the optical function plates are bonded to the large-sized first and fourth polarization beam splitters 11, 14. Therefore, various optical function plates can be attached to the first and fourth polarization beam splitters 11, 14 with good constructing properties, further optical characteristics of the optical color separation and synthesis system 10' can be satisfactorily maintained, and considerations are taken in such a manner as to prevent the optical color separation and synthesis system 10' from being invaded by the dust.

It should be understood that many modifications and adaptations of the invention will become apparent to those skilled in the art and it is intended to encompass such obvious modifications and changes in the scope of the claims appended hereto.

What is claimed is:

1. An optical color separation and synthesis system comprising:
   at least first to fourth polarization beam splitters which chromatically separate white light into a plurality of color beams and which guide the plurality of color beams into a plurality of reflective type spatial light modulation elements corresponding to colors and which chromatically synthesize the respective color beams optically modulated by the respective color reflective type spatial light modulation elements according to a video signal to thereby emit color synthesized light, wherein the first polarization beam splitter is disposed on an incidence side of the white light and the fourth polarization beam splitter is disposed on an emission side of the color synthesized light;
   at least one optical function plate arranged facing any of the first to fourth polarization beam splitters;
   a base platform on which the first to fourth polarization beam splitters are arranged in such a manner that polarization separating surfaces of the polarization beam splitters form an X-shape and onto which the polarization beam splitters are bonded while a predetermined gap is formed between facing surfaces of the polarization beam splitters; and
   first and second frames each of which has an opening in a middle portion thereof and a stepped portion for bonding one of said optical function plates on a peripheral portion thereof,
   the first frame being secured to the first polarization beam splitter, and the second frame being secured to the fourth polarization beam splitter,
   wherein the first frame comprises a bonding flange portion which is to be bonded to the first polarization beam splitter and which is formed along any side surface of the first frame so as to protrude behind a rear surface of the first frame on the opposite side of a front surface of the first frame, and
   wherein the second frame comprises a bonding flange portion which is to be bonded to the fourth polarization beam splitter and which is formed along any side surface of the second frame so as to protrude behind a rear surface of the second frame on the opposite side of a front surface of the second frame.

2. The system according to claim 1, further comprising:
   at least one third frame inserted between the first and second polarization beam splitters, between the second and fourth polarization beam splitters, between the first and third polarization beam splitters, or between the third and fourth polarization beam splitters, said third frame having an opening in the middle portion thereof and a stepped portion for bonding one of said optical function plates on a peripheral portion thereof, wherein the stepped portion of said third frame is engaged with a part of the polarization beam splitter on the side facing the one of said optical function plates bonded to said third frame.

3. The system according to claim 1, further comprising:

at least one third frame inserted between the first and second polarization beam splitters, at least one fourth frame inserted between the second and fourth polarization beam splitters, at least one fifth frame inserted between the first and third polarization beam splitters, and at least one sixth frame inserted between the third and fourth polarization beam splitters, each of said third, fourth, fifth, and sixth frames having an opening in the middle portion thereof and a stepped portion for bonding one of said optical function plates on a peripheral portion thereof, wherein at least one of said third, fourth, fifth, and sixth frames has one of said optical function plates bonded into the stepped portion thereof and at least one other of said third, fourth, fifth, and sixth frames is without any optical function plate bonded into the stepped portion thereof, the third and fourth frames arranged at right angles to each other, the third and fifth frames arranged at right angles to each other, the fourth and sixth frames arranged at right angles to each other, and the fifth and sixth frames arranged at right angles to each other.

4. The system according to claim 1, wherein each of the first and second frames comprises a concave groove, having a rear end formed into an opened state, for charging an adhesive in the protruded bonding flange portion, or a through hole for charging the adhesive in the bonding flange portion.

* * * * *